US012792781B2

(12) United States Patent
Lee et al.

(10) Patent No.: US 12,792,781 B2
(45) Date of Patent: Nov. 10, 2026

(54) STORAGE SYSTEM AND OPERATING METHOD THEREOF

(71) Applicant: Samsung Electronics Co., Ltd., Suwon-si (KR)

(72) Inventors: Dohyeong Lee, Suwon-si (KR); Myeongjong Lee, Suwon-si (KR); Youngmoon Kim, Suwon-si (KR); Hyungsup Kim, Suwon-si (KR); Seongchan Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 18/771,210

(22) Filed: Jul. 12, 2024

(65) Prior Publication Data

US 2025/0028864 A1 Jan. 23, 2025

(30) Foreign Application Priority Data

Jul. 17, 2023 (KR) ........................ 10-2023-0092596
Nov. 22, 2023 (KR) ........................ 10-2023-0163779

(51) Int. Cl.

*G06F 21/64* (2013.01)
*G06F 3/06* (2006.01)
*G06F 21/78* (2013.01)

(52) U.S. Cl.

CPC ............ *G06F 21/64* (2013.01); *G06F 3/0622* (2013.01); *G06F 3/0659* (2013.01); *G06F 3/0673* (2013.01); *G06F 21/78* (2013.01)

(58) Field of Classification Search

CPC .......... G06F 21/64; G06F 21/70; G06F 21/71; G06F 21/78; G06F 3/062; G06F 3/0622; G06F 3/0659; G06F 3/0673

See application file for complete search history.

(56) References Cited

U.S. PATENT DOCUMENTS 7,679,133 B2 3/2010 Son et al.
8,196,208 B2 * 6/2012 Kim ...................... H04L 9/0816 726/26
8,553,466 B2 10/2013 Han et al.

(Continued)

FOREIGN PATENT DOCUMENTS

CN 113297071 A * 8/2021 .......... G06F 11/3692
CN 114218589 A * 3/2022 ........... G06F 21/602

(Continued)

OTHER PUBLICATIONS

Extended European Search Report for corresponding European Patent Application No. 24188596.1 issued on Dec. 12, 2024.

*Primary Examiner* — Jonathan A Bui

(74) *Attorney, Agent, or Firm* — FISH & RICHARDSON P.C.

(57) ABSTRACT

Provided is a storage system including a host configured to generate a hash value for a first command, merge the hash value with a random value, and provide a signature for merged data and the first command, and a storage device configured to store the random value corresponding to the first command in a first buffer, provide the random value to the host, receive the first command and the signature from the host, store the signature in a second buffer, verify the signature, and in response to verification being completed, delete the random value from the first buffer and execute the first command.

20 Claims, 20 Drawing Sheets

(56) References Cited

U.S. PATENT DOCUMENTS

| | | | | |
|---|---|---|---|---|
| 8,559,235 | B2 | 10/2013 | Yoon et al. | |
| 8,654,587 | B2 | 2/2014 | Yoon et al. | |
| 9,921,978 | B1 * | 3/2018 | Chan | G06F 3/0622 |
| 11,714,561 | B2 * | 8/2023 | Hong | G06F 3/0622 711/163 |
| 2010/0153706 | A1 * | 6/2010 | Haddad | H04L 9/0662 713/153 |
| 2011/0233648 | A1 | 9/2011 | Seol et al. | |
| 2014/0025944 | A1 * | 1/2014 | Maletsky | G06F 21/57 713/150 |
| 2021/0081334 | A1 | 3/2021 | Duval | |
| 2021/0243035 | A1 | 8/2021 | Ruane et al. | |
| 2022/0019356 | A1 * | 1/2022 | Hong | G06F 3/0637 |
| 2022/0100425 | A1 * | 3/2022 | Ryu | G06F 3/0659 |
| 2022/0113909 | A1 | 4/2022 | Shin et al. | |
| 2022/0129389 | A1 | 4/2022 | Shiner et al. | |
| 2022/0231858 | A1 | 7/2022 | Dover | |
| 2022/0382916 | A1 | 12/2022 | Duval et al. | |
| 2023/0057638 | A1 | 2/2023 | Duval | |
| 2023/0109300 | A1 | 4/2023 | Shin et al. | |
| 2023/0186289 | A1 | 6/2023 | Bert et al. | |

FOREIGN PATENT DOCUMENTS

| | | | | |
|---|---|---|---|---|
| KR | 20090006954 | A * | 1/2009 | B41J 29/393 |
| KR | 10-2022-0092770 | A | 7/2022 | |
| KR | 10-2023-0064538 | A | 5/2023 | |

* cited by examiner

FIG. 13

Header

| COMMAND UPIU | | | |
|---|---|---|---|
| 0<br>xx00 0001b | 1<br>Flags | 2<br>LUN | 3<br>Task Tag |
| 4<br>Initiator ID \| Command Set Type | 5<br>Reserved | 6<br>Reserved | 7<br>Reserved |
| 8<br>Total EHS Length | 9<br>Reserved | 10 | 11<br>Data Segment Length |
| 12 | 13 | 14 | 15<br>Expected Data Transfer Length |
| 16~31<br>CDB[0]~CDB[15] | | | |
| Header E2ECRC | | | |

FIG. 14

Header (bytes 0–11)

<table>
<tr><td colspan="5">RESPONSE UPIU</td></tr>
<tr><td colspan="2">0<br>xx10 0001b</td><td>1<br>Flags</td><td>2<br>LUN</td><td>3<br>Task Tag</td></tr>
<tr><td colspan="2">4</td><td rowspan="2">5<br>Reserved</td><td rowspan="2">6<br>Response</td><td rowspan="2">7<br>Status</td></tr>
<tr><td>Initiator ID</td><td>Command Set Type</td></tr>
<tr><td colspan="2">8<br>Total EHS Length</td><td>9<br>Device Information</td><td colspan="2">10 | 11<br>Data Segment Length</td></tr>
<tr><td colspan="5">12 | 13 | 14 | 15<br>Residual Transfer Count</td></tr>
<tr><td colspan="5">16~31<br>Reserved</td></tr>
<tr><td colspan="5">Header E2ECRC</td></tr>
<tr><td colspan="3">K | K+1<br>Sense Data Length</td><td colspan="2">K+2~K+19<br>Sense Data</td></tr>
<tr><td colspan="5">Data E2ECRC</td></tr>
</table>

FIG. 15

Header

| DATA OUT UPIU | | | |
|---|---|---|---|
| 0<br>xx00 0010b | 1<br>Flags | 2<br>LUN | 3<br>Task Tag |
| 4<br>Initiator ID \| Command Set Type | 5<br>Reserved | 6<br>Reserved | 7<br>Reserved |
| 8<br>Total EHS Length | 9<br>Reserved | 10 11<br>Data Segment Length | |
| 12 13 14 15<br>Data Buffer Offset | | | |
| 16 17 18 19<br>Data Transfer Count | | | |
| 20~31<br>Reserved | | | |
| Header E2ECRC | | | |
| k~k+Length-1<br>Data[0]~Data[Length-1] | | | |
| Data E2ECRC | | | |

FIG. 16

| DATA IN UPIU | | | | |
|---|---|---|---|---|
| Header | 0<br>xx10 0010b | 1<br>Flags | 2<br>LUN | 3<br>Task Tag |
| Header | 4<br>Initiator ID \| Reserved | 5<br>Reserved | 6<br>Reserved | 7<br>Reserved |
| Header | 8<br>Total EHS Length | 9<br>Reserved | 10 \| 11<br>Data Segment Length | |
| | 12 \| 13 \| 14 \| 15<br>Data Buffer Offset | | | |
| | 16 \| 17 \| 18 \| 19<br>Data Transfer Count | | | |
| | 20~31<br>Reserved | | | |
| | Header E2ECRC | | | |
| | k~k+Length-1<br>Data[0]~Data[Length-1] | | | |
| | Data E2ECRC | | | |

FIG. 18

| WRITE BUFFER COMMAND | | | | | | | | |
|---|---|---|---|---|---|---|---|---|
| Bit / Byte | 7 | 6 | 5 | 4 | 3 | 2 | 1 | 0 |
| 0 | OPERATION CODE (3Bh) | | | | | | | |
| 1 | Reserved | | | MODE | | | | |
| 2 | BUFFER ID | | | | | | | |
| 3 | BUFFER OFFSET | | | | | | | |
| 4 | | | | | | | | |
| 5 | | | | | | | | |
| 6 | PARAMETER LIST LENGTH | | | | | | | |
| 7 | | | | | | | | |
| 8 | | | | | | | | |
| 9 | CONTROL = 00h | | | | | | | |

2000

STORAGE SYSTEM AND OPERATING METHOD THEREOF

CROSS-REFERENCE TO RELATED APPLICATION

This application is based on and claims priority under 35 U.S.C. § 119 to Korean Patent Application Nos. 10-2023-0092596, filed on Jul. 17, 2023, and 10-2023-0163779, filed on Nov. 22, 2023, in the Korean Intellectual Property Office, the disclosures of which are incorporated by reference herein in their entireties.

BACKGROUND

The inventive concepts relate to storage systems, and more particularly, to storage systems capable of authenticating a command and an operating method thereof.

When a host provides a command to a storage device, an attacker may steal the command by monitoring a transfer path between the host and the storage device.

By providing the stolen command to the storage device, the attacker can gain access to an area of the host that the attacker wants to access, and thus, security of communication between the host and the storage device is required.

SUMMARY

The inventive concepts provide storage systems capable of generating a signature for a command and verifying the signature to authenticate the command.

According to some aspects of the inventive concepts, there is provided a storage system including a host configured to generate a hash value for a first command, merge the hash value and a random value, and provide a signature for the merged data and the first command, and a storage device configured to store the random value corresponding to the first command in a first buffer, provide the random value to the host, receive the first command and the signature from the host, store the signature in a second buffer, verify the signature, and in response to the verification being completed, delete the random value from the first buffer, and execute the first command.

According to other aspects of the inventive concepts, there is provided a method of operating a storage system, the method including providing, in a storage device, a random value stored in a first buffer to a host, generating, in the host, a signature based on a first command and the random value, providing, in the host, the first command and the signature to the storage device, storing, in the storage device, the signature in a second buffer, verifying, in the storage device, the signature based on the random value, and executing, in the storage device, the first command based on the result of the verification.

According to other aspects of the inventive concept, there is provided a storage system including a storage device configured to provide a random value, and, based on a received command and a signature, verify the signature, and execute the command when the verification is completed, and a host configured to receive the random value, generate the signature based on the random value and the command, and provide the command and the signature to the storage device.

BRIEF DESCRIPTION OF THE DRAWINGS

Example embodiments will be more clearly understood from the following detailed description taken in conjunction with the accompanying drawings in which:

FIG. 13 is a diagram of a data structure of a command UPIU according to some example embodiments;

FIG. 14 is a diagram of a data structure of a response UPIU according to some example embodiments;

FIG. 15 is a diagram of a data structure of a data out UPIU according to some example embodiments;

FIG. 16 is a diagram of a data structure of a data in UPIU according to some example embodiments;

FIG. 18 is a diagram of a structure of a write buffer command according to some example embodiments;

DETAILED DESCRIPTION

Hereinafter, some example embodiments are described with reference to the accompanying drawings.

Figure 1:
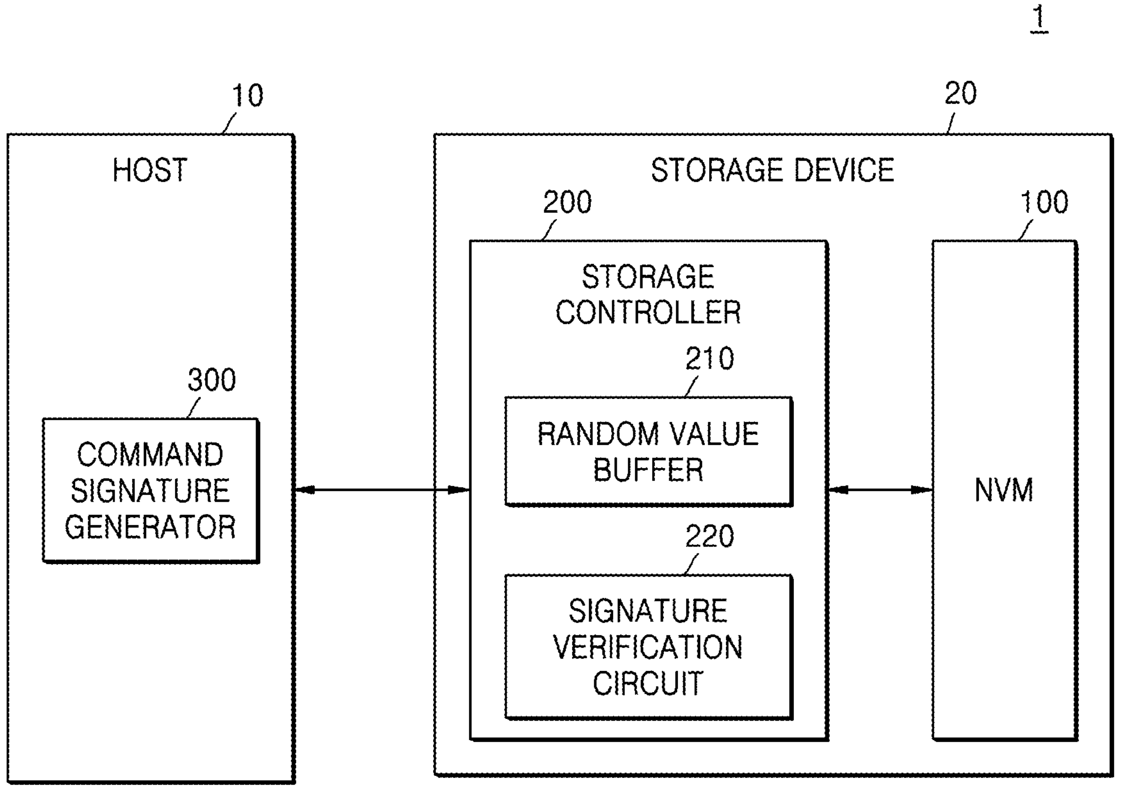
FIG. 1 is a diagram of a storage system according to some example embodiments.

FIG. 1 is a diagram of a storage system according to some example embodiments.

Referring to FIG. 1, a storage system 1 may include a host 10 and a storage device 20. The storage device 20 may include a storage controller 200 and non-volatile memory (NVM) 100.

The storage system 1 may be a stationary computing system, such as a server, a desktop computer, a kiosk, or a subsystem thereof, but is not limited thereto. In some example embodiments, the storage system 1 may be a portable computing system, such as a mobile phone, a wearable device, a laptop computer, or a subsystem thereof, but is not limited thereto. In some example embodiments, the storage system 1 may be a subsystem included in any system different from a standalone computing system, such as home appliances, industrial equipment, and vehicles, but is not limited thereto.

The host 10 may generate a plurality of commands and may provide the plurality of commands to the storage device 20. The host 10 may include a command signature generator 300. The command signature generator 300 may generate a signature for at least one command among the plurality of commands. For example, the command signature generator 300 may generate a hash value for the command, merge the hash value with a random value, and generate a digital signature for the merged data based on at least one of a secret key and a public key. Herein, the digital signature may be referred to as a signature.

The storage device 20 may include storage media for storing data according to a request from the host 10. As an example, the storage device 20 may include at least one of a solid-state drive (SSD), embedded memory, and removable external memory. When the storage device 20 is an SSD, the storage device 20 may be a device that conforms to an NVM express (NVMe) standard. When the storage device 20 is embedded memory or external memory, the storage device 20 may be a device that conforms to a universal flash storage (UFS) or embedded multi-media card (eMMC) standard. The host 10 and the storage device 20 may each generate and transmit a packet according to the used standard protocol.

When the NVM 100 of the storage device 20 includes flash memory, the flash memory may include a 2D NAND memory array or a 3D (or vertical) NAND (VNAND) memory array. As another example, the storage device 20 may include various other types of NVMs. For example, the storage device 20 may include magnetic RAM (MRAM), spin-transfer torque MRAM, conductive bridging RAM (CBRAM), ferroelectric RAM (FeRAM), phase-change RAM (PRAM), resistive RAM (ReRAM), and/or other various types of memories.

The storage controller 200 may include a random value buffer 210 and a signature verification circuit 220.

The random value buffer 210 may store a random value corresponding to each command received from the host 10. The random value may be stored in the random value buffer 210 from a time when the command is received from the host 10 to a time when the command is processed. The random value may be deleted from the random value buffer 210 after the command is processed.

The signature verification circuit 220 may verify a signature corresponding to the command from the host 10. Specifically, the signature verification circuit 220 may generate a digest to be compared by performing decryption on the signature based on at least one of the public key and the private key. The signature verification circuit 220 may verify the signature by generating a hash value for the command received from the host 10, merging the hash value with a random value corresponding to the command, and comparing the merged data with the digest to be compared. When the verification is successful, the storage controller 200 may execute the command. For example, when the command is a write command, the storage controller 200 may store data received from the host 10 in the NVM 100. When the command is a read command, the storage controller 200 may read data from the NVM 100, and may provide the read data to the host 10.

According to some example embodiments, security for each command may be enhanced by authenticating the command itself.

According to some example embodiments, since the storage controller 200 performs verification based on the merge data between the hash value of the command and the random value, the verification of the command may fail when the random value is deleted. As the storage controller 200 deletes the random value for the command that has been authenticated, the verification of the re-received command may fail even though the same command is received again. Therefore, the security performance provided may be effective against replay attacks that steal transmission information between the host 10 and the storage device 20 or brute force attacks.

Figure 2:
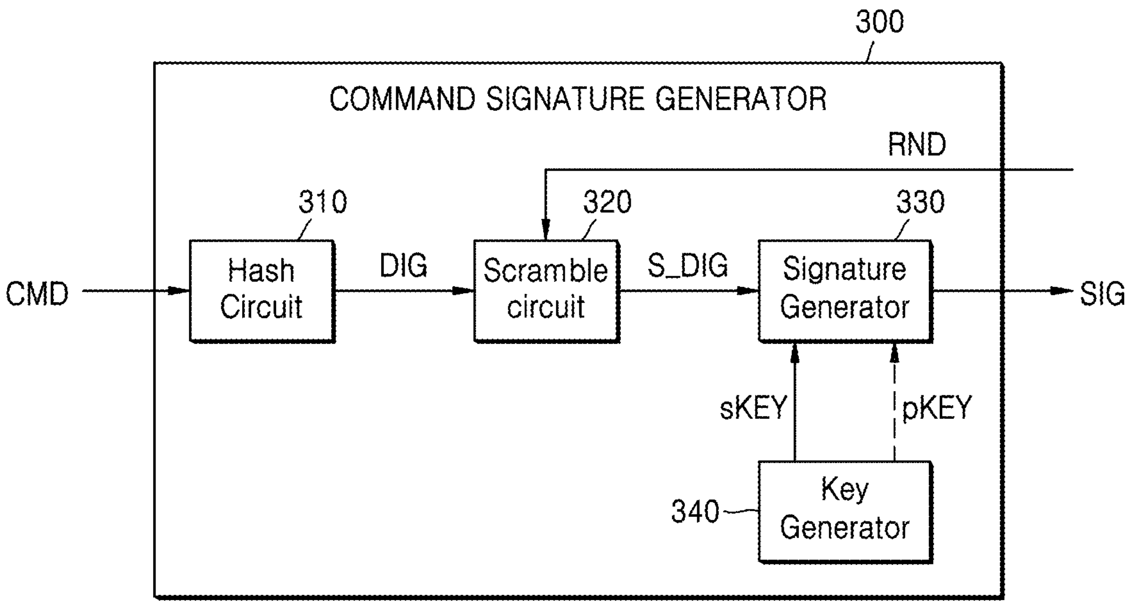
FIG. 2 is a diagram of a command signature generator according to some example embodiments.

FIG. 2 is a diagram of a command signature generator 300 according to some example embodiments. FIG. 2 may be described below with reference to FIG. 1. The command signature generator 300 may be implemented in any computing system. For example, each component of the command signature generator 300 may be implemented by a hardware module designed through logical synthesis, a software module executed by at least one core, a processing unit including the at least one core and the software module, and a combination thereof.

The command signature generator 300 may be included in the host 10 described above with reference to FIG. 1. Alternatively, the command signature generator 300 may be located away from the host 10, and may be included in a certificate authority (CA) server that generates a certificate. The CA server may generate and provide a signature for a command to the host 10.

The command signature generator 300 may receive a command CMD and a random value RND, and may provide a signature SIG.

The command signature generator 300 may include a hash circuit 310, a scramble circuit 320, a signature generator 330, and a key generator 340.

The key generator 340 may generate a key pair including a secret key sKEY and a public key pKEY. For example, the key generator 340 may include a random number generator, and may generate a key pair based on a random number. In some example embodiments, the key generator 340 may be omitted, and the command signature generator 300 may receive at least one key of the key pair from the outside.

The hash circuit 310 may receive the command CMD and generate a digest DIG for the command CMD. The digest DIG may refer to a hash value generated based on a hash algorithm, such as a secure hash algorithm (SHA).

The scramble circuit 320 may combine the digest DIG with the random value RND. For example, the scramble circuit 320 may perform an XOR operation on the digest DIG and the random value RND. The length of the digest DIG may be the same as or different from the random value RND.

The signature generator 330 may receive the secret key sKEY from the key generator 340, and may generate a signature SIG for the digest DIG based on the secret key sKEY. The signature SIG may be generated based on any signature algorithm, for example, based on at least one of an elliptic curve digital signature algorithm (ECDSA), a hash-based message authentication code, or an RSA algorithm. In some example embodiments, as shown in FIG. 2, the signature generator 330 may receive the public key pKEY, or may generate the signature SIG based on the secret key sKEY and the public Key pKEY.

In some example embodiments, the command signature generator 300 may further include a circuit that generates the command CMD and the signature SIG in the form of a digital envelope and provides the generated digital envelope.

In some example embodiments, the command signature generator 300 may further include an encryption circuit, and the encryption circuit may perform additional encryption on the signature SIG, and may output the encrypted signature SIG.

Although it is described above that the command signature generator 300 generates the signature SIG for the command CMD, the command signature generator 300 may receive an additional signature from the CA server to provide a certificate chain including a plurality of signatures for the command CMD.

Figure 3:
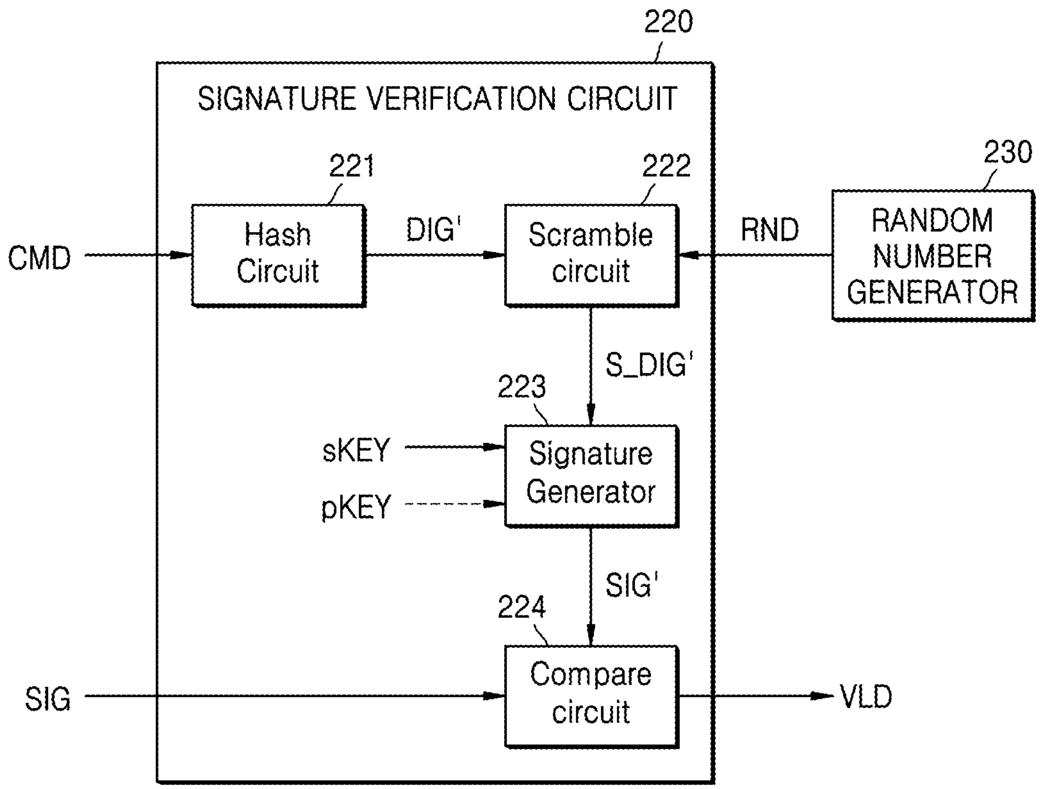
FIG. 3 is a diagram of a signature verification circuit and a random number generator according to some example embodiments.

FIG. 3 is a diagram of a signature verification circuit 220 and a random number generator 230 according to some example embodiments. The signature verification circuit 220 of FIG. 3 may be included in the storage controller 200. The signature verification circuit 220 may verify the signature received from the host 10, and the storage controller 200 may execute the command based on the verification result for the signature.

Referring to FIG. 3, the signature verification circuit 220 may receive a command CMD and a signature SIG, and may verify the signature SIG based on at least one of a public key pKEY or a symmetric secret key sKEY, thereby authenticating the command CMD.

The signature verification circuit 220 may include a hash circuit 221, a scramble circuit 222, a signature generator 223, and a compare circuit 224.

The hash circuit 221 may generate a digest DIG' for the command CMD based on the hash algorithm. The scramble circuit 222 may generate a merged digest S_DIG' by merging the digest DIG' with a random value RND.

The signature generator 223 may generate a signature SIG' for the merged digest S_DIG' based on the secret key sKEY. The signature SIG' may be generated based on any signature algorithm, for example, based on at least one of an ECDSA, a hash-based message authentication code, or an RSA algorithm. The signature generator 223 may generate the signature SIG' by using the same signature algorithm as the signature generator 330 of FIG. 2. In some example embodiments, the signature generator 223 may receive the public key pKEY, or may generate the signature SIG' based on the secret key sKEY and the public Key pKEY.

The signature verification circuit 220 may receive the signature SIG generated by the command signature generator 300 of FIG. 2. In some example embodiments, the signature verification circuit 220 may further include a decoding circuit, and the decoding circuit may obtain the signature SIG by decoding the encrypted signature SIG.

The compare circuit 224 may generate validity information VLD by comparing the signature SIG received from the command signature generator 300 of FIG. 2 with the signature SIG' generated by the signature generator 223 of FIG. 3. The validity information VLD may be information indicating that the command CMD is valid.

For example, when the validity information VLD indicates that the command CMD is valid, the storage controller 200 may determine the command CMD as a reliable command, and may execute the command CMD. When the validity information VLD indicates that the command CMD is not valid, the storage controller 200 may request a new signature from the host 10 without executing the command CMD. In some example embodiments, when the validity information VLD indicates that the command CMD is not valid, the storage controller 200 may provide the host with information indicating that execution of the command CMD has failed or information indicating that execution of the command CMD is not possible.

Figure 4:
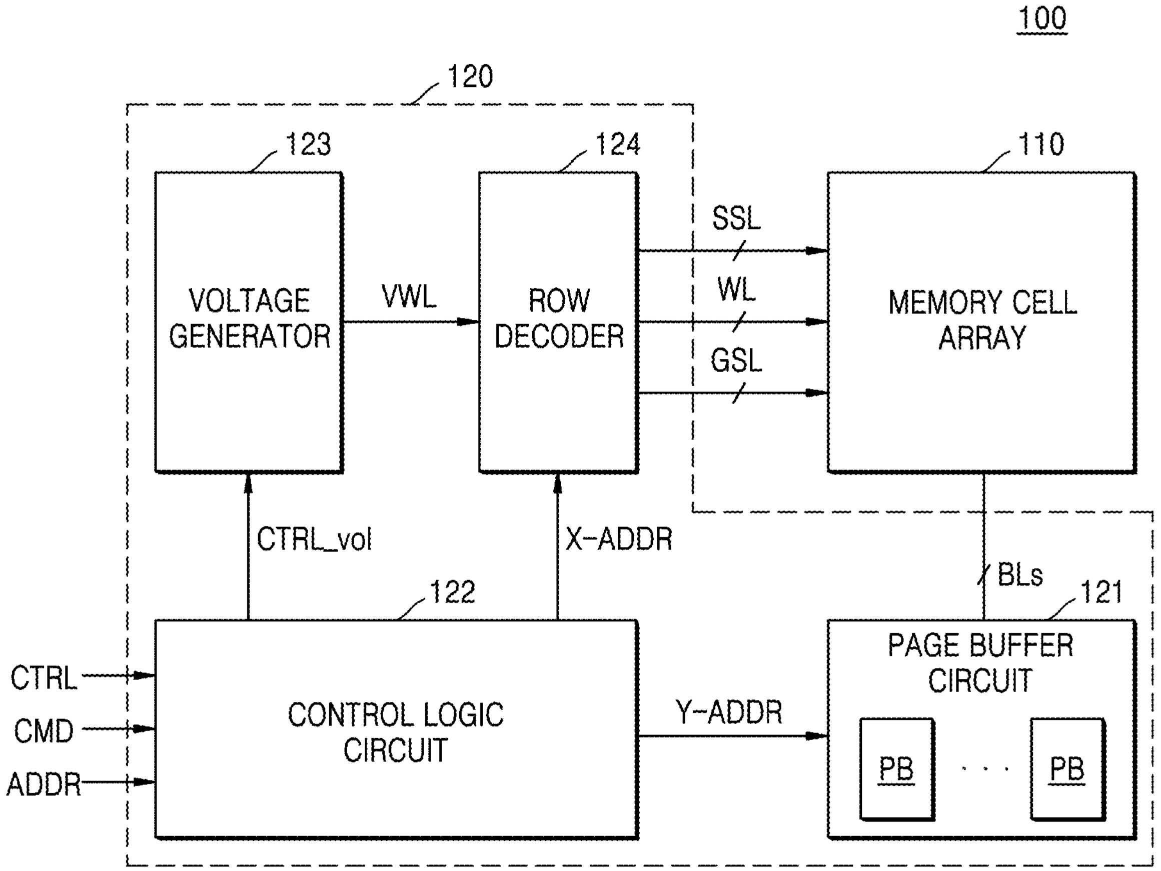
FIG. 4 is a diagram of nonvolatile memory according to some example embodiments.

FIG. 4 is a block diagram of NVM 100 according to some example embodiments.

Referring to FIG. 4, the NVM 100 may include a memory cell array 110 and a peripheral circuit 120, and the periphery circuit 120 may include a page buffer circuit 121, a control logic circuit 122, a voltage generator 123, and a row decoder 124. Although not shown in FIG. 4, the peripheral circuit 120 may further include a data input/output (I/O) circuit or an I/O interface. In addition, the peripheral circuit 120 may further include a column logic, a pre-decoder, a temperature sensor, a command decoder, an address decoder, and the like.

The memory cell array 110 may be connected to the page buffer circuit 121 through bit lines BL, and may be connected to the row decoder 124 through word lines WL, string select lines SSL, and ground select lines GSL. The memory cell array 110 may include a plurality of memory cells, and for example, the memory cells may be flash memory cells. In some example embodiments, the plurality of memory cells may be general NAND flash memory cells, and may be resistive memory cells, such as ReRAM, PRAM, or MRAM.

In some example embodiments, the memory cell array 110 may include a three-dimensional memory cell array, where the three-dimensional memory cell array may include a plurality of NAND strings, and each NAND string may include memory cells respectively connected to word lines vertically stacked on a substrate. U.S. Pat. Nos. 7,679,133, 8,553,466, 8,654,587, 8,559,235, and U.S. Patent Application Publication No. 2011/0233648 are incorporated herein by reference in their entirety and describe suitable configurations for a three-dimensional memory array arranged in multiple levels with word lines and/or bit lines shared between the levels. However, the inventive concepts are not limited thereto. In some example embodiments, the memory cell array 110 may include a two-dimensional memory cell array, and the two-dimensional memory cell array may include a plurality of NAND strings arranged in row and column directions.

The control logic circuit 122 may output various control signals for programming data to the memory cell array 110, reading data from the memory cell array 110, or erasing data stored in the memory cell array 110, such as a voltage control signal CTRL_vol, a row address X-ADDR, and a column address Y-ADDR, based on a command CMD, an address ADDR, and a control signal CTRL. Accordingly, the control logic circuit 122 may generally control various operations in the NVM 100.

The voltage generator 123 may generate various types of voltages for performing program, read, and erase operations on the memory cell array 110 based on the voltage control signal CTRL_vol. Specifically, the voltage generator 123 may generate a word line voltage VWL, for example, a program voltage, a read voltage, a pass voltage, an erase verification voltage, or a program verification voltage. In addition, the voltage generator 123 may further generate a string select line voltage and a ground select line voltage based on the voltage control signal CTRL_vol.

The row decoder 124 may select one of a plurality of memory blocks in response to the row address X-ADDR, may select one of word lines WL of the selected memory block, and may select one of string select lines SSL. The page buffer circuit 121 may select some of bit lines BL in response to the column address Y-ADDR. Specifically, the page buffer circuit 121 operates as a write driver or a sense amplifier depending on an operation mode.

The page buffer circuit 121 may include a plurality of page buffers PB respectively connected to the plurality of bit lines BL.

Figure 5:
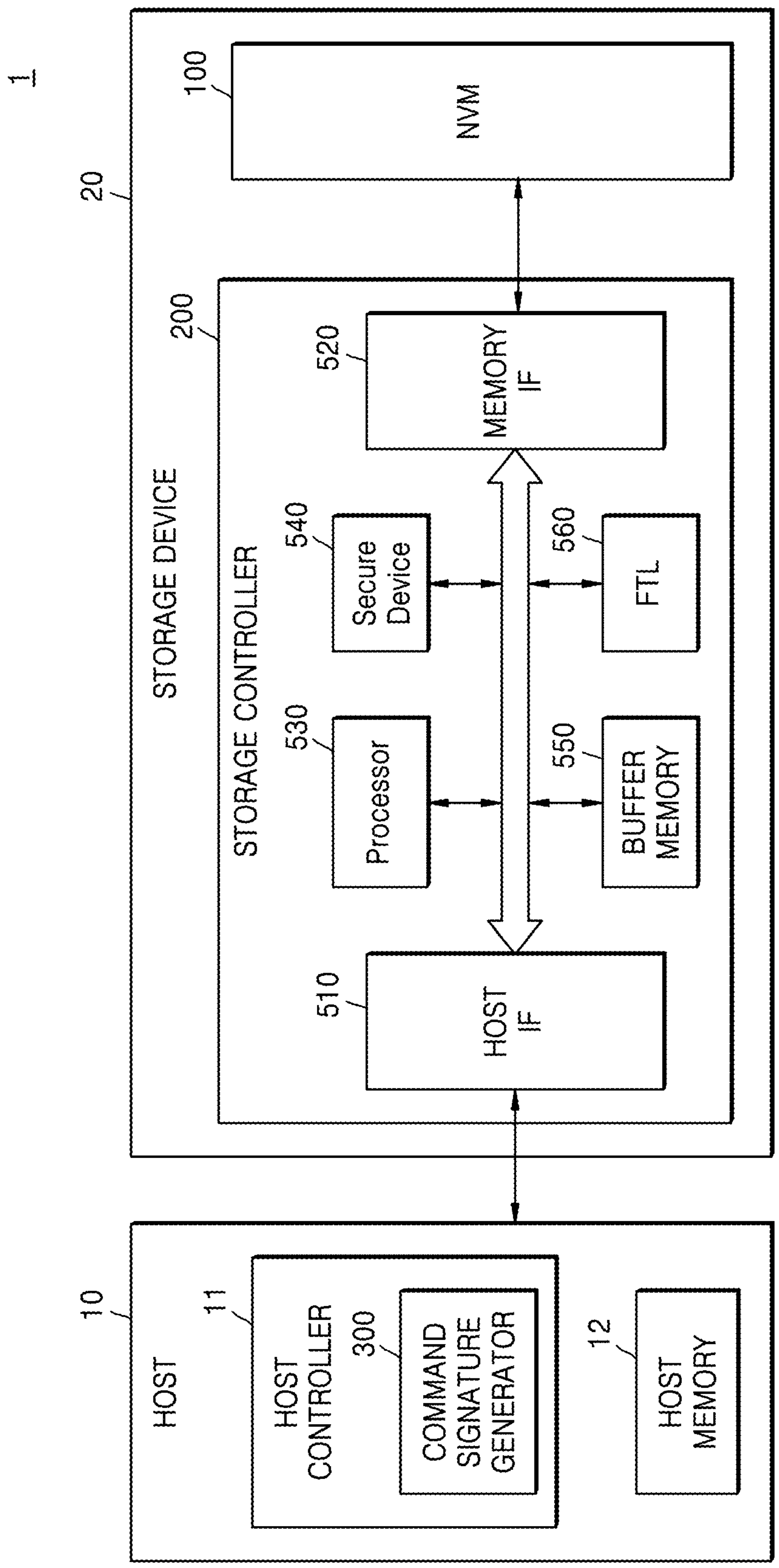
FIG. 5 is a block diagram of a storage system according to some example embodiments.

FIG. 5 is a block diagram of a storage system according to some example embodiments.

Referring to FIG. 5, a storage system 1 may include a host 10 and a storage device 20. The host 10 may include a host controller 11 and a host memory 12. The storage device 20 may include a storage controller 200 and a NVM 100.

The host memory 12 may function as a buffer memory for temporarily storing data to be transmitted to the storage device 20 or data transmitted from the storage device 20. Although not shown, the host memory 12 may include a secure memory, and the secure memory may store the secret key sKEY and the public key pKEY which are described above with reference to FIG. 2. The secure memory may be included in a secure device 540 or may be part of a buffer memory 550.

In some example embodiments, the host controller 11 and the host memory 12 may be implemented as separate semiconductor chips. Alternatively, in some example embodiments, the host controller 11 and the host memory 12 may be integrated into the same semiconductor chip. As an example, the host controller 11 may be any one of a plurality of modules provided in an application processor, and the application processor may be implemented as a system on chip (SoC). In addition, the host memory 12 may be an embedded memory provided in the application processor, or may be a NVM or a memory module placed outside the application processor.

The host controller 11 may manage an operation of storing data stored in the host memory 12 in the storage device 20, or may manage an operation of storing data of the storage device 20 in the host memory 12. The host controller 11 may include the command signature generator 300. As described above with reference to FIGS. 1 and 2, the command signature generator 300 may generate a signature based on a random value received from the storage controller 200 and a command, and may provide the command and the signature to the storage controller 200.

The storage controller 200 may include a host interface 510, a memory interface 520, a processor 530, a secure device 540, and a buffer memory 550. Herein, the buffer memory 550 may be referred to as a system memory.

The host interface 510 may transmit and receive a packet to and from the host 10. The packet transmitted from the host 10 to the host interface 510 may include a command, data to be written to the NVM 100, or data to been written to a storage space (e.g., the buffer memory 550) in the storage controller 200, and the packet transmitted from the host interface 510 to the host 10 may include a response to the command or data read from the NVM 100.

The memory interface 520 may transmit data to be written to the NVM 100 to the NVM 100 or may receive data read from the NVM 100. The memory interface 520 may be implemented to comply with a standard convention, such as Toggle or ONFI.

The processor 530 may further include a hardware accelerator designed to perform a predefined operation at high speed, an I/O interface that provides a communication channel with an external component of the processor 530, and the like. In some example embodiments, components of the processor 530 may be integrated into a single chip or a single die, and the processor 530 may be referred to as a SoC. In some example embodiments, components of the processor 530 may be integrated into two or more chips included in one package, and the processor 530 may be referred to as a system-in-package (SiP). The processor 530 may be referred to as a micro control unit (MCU).

The secure device 540 may store a signature for the command or a random value. In some example embodiments, the secure device 540 may store a key (e.g., the public key pKEY of FIG. 2) used for encryption and decryption of data transmitted/received to/from the host 10. The secure device 540 may non-volatilely store unique data of the storage device 20. In some example embodiments, the secure device 540 may include the signature verification circuit 220 and the random number generator 230 of FIG. 3.

The buffer memory 550 may temporarily store data used by the processor 530. For example, the buffer memory 550 may temporarily store data read from the secure device 540 or the NVM 100, or may temporarily store data to be written to the secure device 540 or NVM 100. In addition, the buffer memory 550 may temporarily store instructions executed by the processor 530. In some example embodiments, the buffer memory 550 may include a volatile memory that provides a relatively fast operation speed, such as a dynamic random access memory (DRAM) or a static random access memory (SRAM).

A flash translation layer (FTL) 560 may perform various functions, such as address mapping, wear-leveling, and garbage collection. The address mapping is an operation of changing a logical address received from the host 10 into a physical address used to store data in the NVM 100. The wear-leveling which is a technology for preventing or reducing in likelihood excessive degradation of a specific block by allowing blocks in the NVM 100 to be used uniformly may be implemented through, e.g., a firmware technology for balancing erase counts of physical blocks. The garbage collection is a technology for securing usable capacity within the non-volatile memory 100 by copying valid data of a block to a new block and then erasing the existing block.

Figure 6:
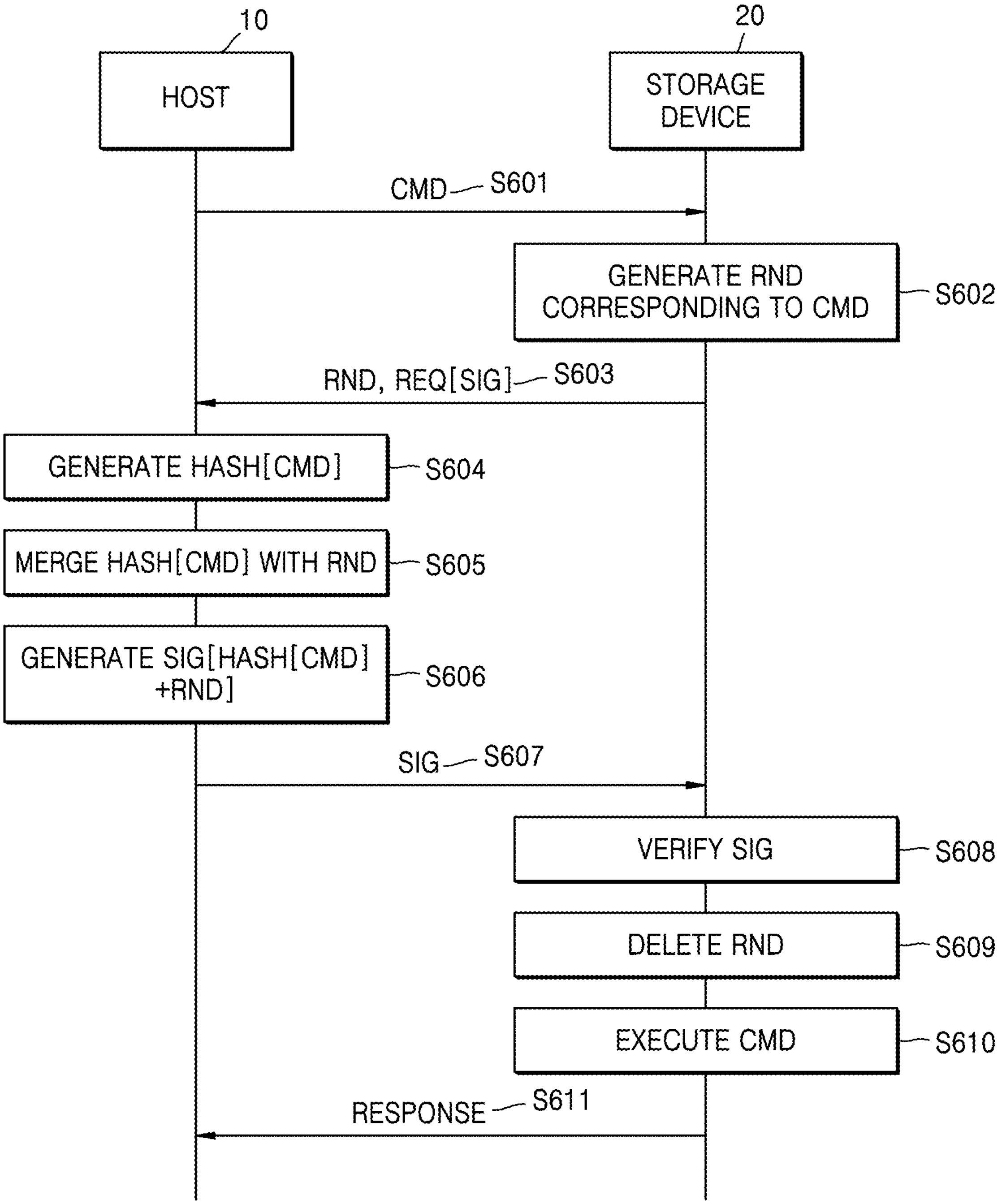
FIG. 6 is a diagram illustrating an operating method of a storage system according to some example embodiments.

FIG. 6 is a diagram illustrating an operating method of a storage system according to some example embodiments.

Referring to FIG. 6, a host 10 may provide a command CMD to a storage device 20 (S601). The command CMD may be a specific command used by a predetermined or alternatively desirable vendor to access data stored in the storage device 20.

The storage device 20 may generate a random value RND corresponding to the command CMD (S602). The random value RND may be a unique value for the command CMD.

The storage device 20 may provide a request REQ for a signature SIG of the command CMD and the random value RND to the host 10 (S603). In some example embodiments, when the signature SIG for the command CMD is not stored in the storage device 20 or the verification of the signature SIG stored in the storage device 20 fails, the storage device 20 may provide the request REQ and the random value RND to the host 10.

The host 10 may generate a hash value HASH [CMD] for the command CMD (S604). Specifically, the host 10 may generate a digest for the command CMD based on various hash algorithms.

The host 10 may merge the hash value HASH [CMD] with the random value RND to generate a merged digest Hash [CMD]+RND (S605). The merged digest may be referred to as merged data.

The host 10 may generate a signature SIG for the merged digest Hash [CMD]+RND (S606). Specifically, the host 10 may generate the signature SIG based on at least one of a public key and a secret key.

The host 10 may provide the signature SIG to the storage device 20 (S607).

The storage device 20 may verify the signature SIG (S608). Specifically, the storage device 20 may generate a merged digest (e.g., S_DIG' of FIG. 3) by merging the hash value for the command CMD with the random value RND. The storage device 20 may generate a signature (e.g., SIG' of FIG. 3) for the merged digest based on at least one of the public key and the private key. The storage device 20 may verify the signature SIG by comparing the generated signature SIG' with the signature SIG received from the host 10.

When verification of the signature SIG is successful, the storage device 20 may delete the random value RND stored in the storage device 20 (S609). Since the random value RND unique to the command CMD is deleted, verification of the command CMD may fail even though the same command CMD is received from an attacker later. Accordingly, security for the command CMD may be improved. In some example embodiments, when the storage device 20 receives the same command from the host 10 more than a reference number of times, the storage device 20 may delete a random value for the command.

When verification of the signature SIG is successful, the storage device 20 may execute the command CMD (S610). For example, when the command CMD is a write command, data may be stored in the NVM 100, and when the command CMD is a read command, data may be read from the NVM 100.

When execution of the command CMD is completed, the storage device 20 may provide a response to the command CMD to the host 10 (S611).

Figure 7:
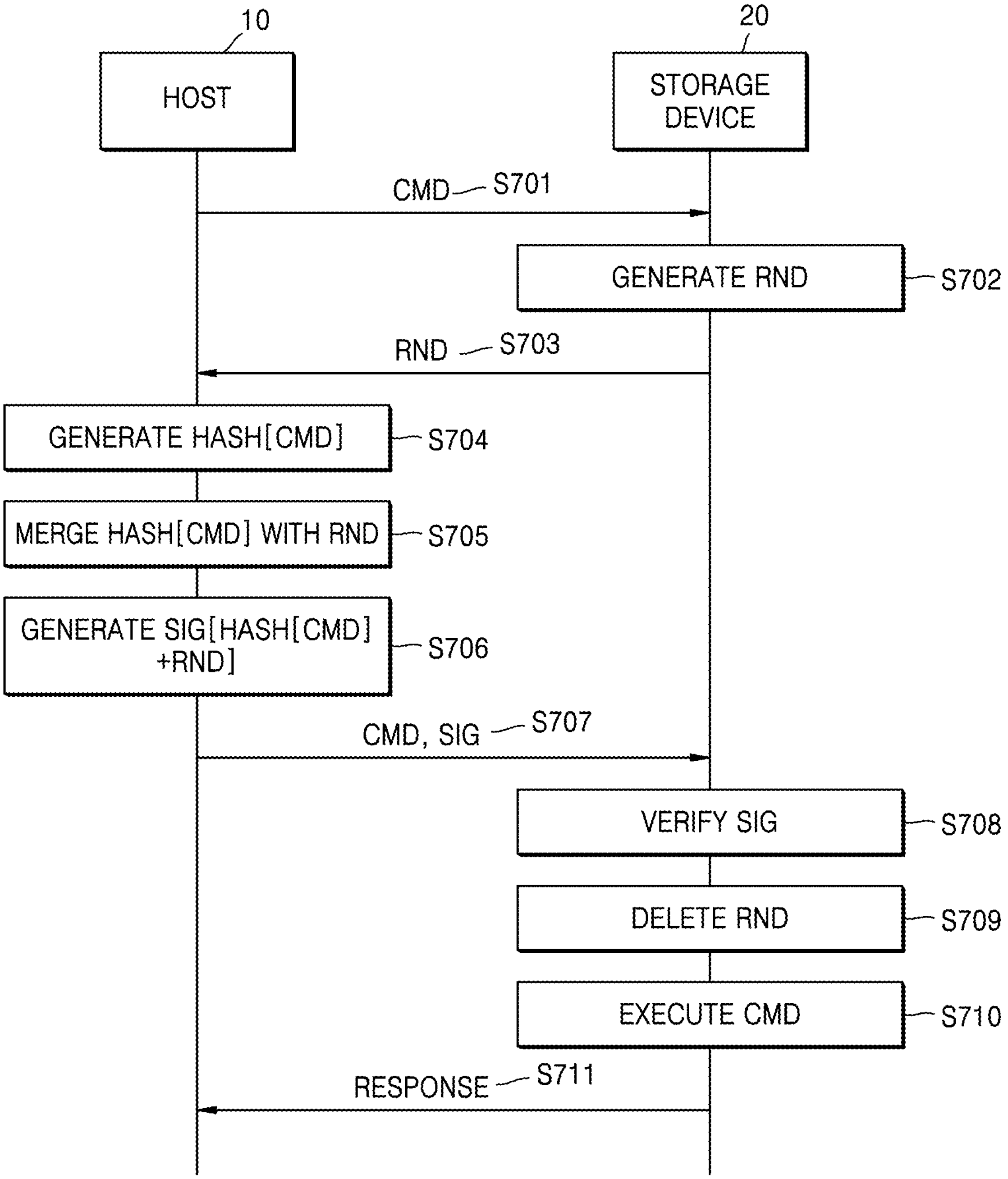
FIG. 7 is a diagram illustrating an operating method of a storage system according to some example embodiments.

FIG. 7 is a diagram illustrating an operating method of a storage system according to some example embodiments.

Referring to FIG. 7, a host 10 may provide a command CMD to a storage device 20 (S701). In some example embodiments, the command CMD may be a command that requests generation of a random value RND. In some example embodiments, the command CMD may be a special command used by a predetermined or alternatively desirable vendor to access data stored in the storage device 20. In some example embodiments, the storage device 20 may provide the random value RND to the host 10 before receiving the command CMD from the host 10.

The storage device 20 may generate the random value RND in response to the command CMD received from the host 10 (S702). The storage device 20 may provide the random value RND to the host 10 (S703).

The host 10 may generate a hash value Hash [CMD] for the command CMD to be provided to the storage device 20 (S704). Operations S705 and S706 may be the same as operations S605 and S606, respectively.

The host 10 may provide the command CMD and the signature SIG to the storage device 20 (S707). Unlike FIG. 6, the host 10 may include the command CMD and the signature SIG in the same packet, and may provide the packet to the storage device 20. That is, the host 10 may provide both the command CMD and the signature SIG to the storage device 20. The command CMD may be a special command used by a predetermined or alternatively desirable vendor to access data stored in the storage device 20.

Operations S708 to S711 may be the same as operations S608 to S611, respectively.

In FIG. 7, unlike FIG. 6 in which the storage device 20 provides the request REQ for the signature SIG to the host 10 (S603), the host 10 may provide the signature SIG to the storage device 20 in response to the command CMD received from the host 10, without the request REQ, thereby improving the authentication speed. For example, the host 10 may provide the signature to the storage device 20 in response to the host receiving the random value RND from the storage device 20.

Figure 8:
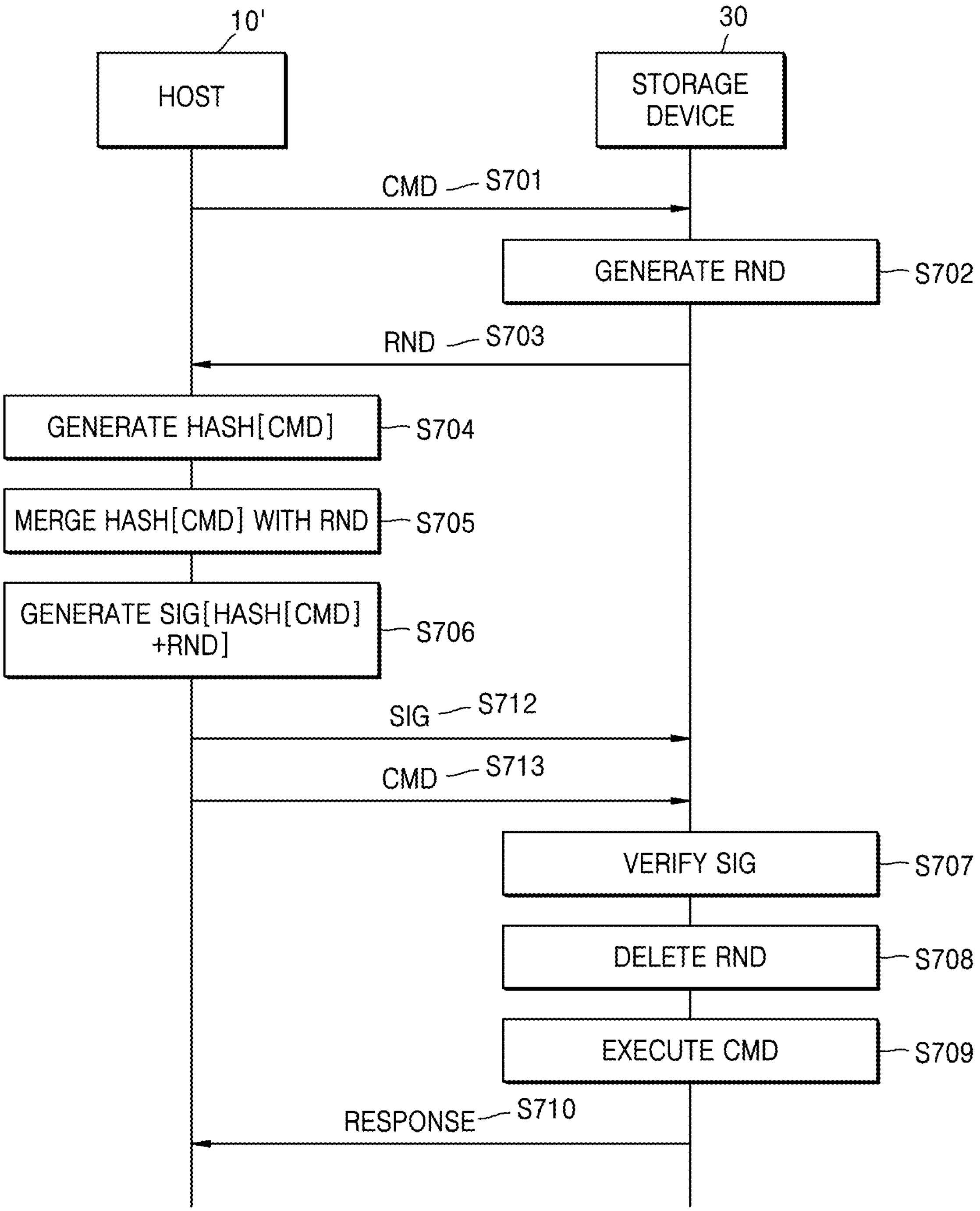
FIG. 8 is a diagram illustrating an operating method of a storage system according to some example embodiments.

FIG. 8 is a diagram illustrating an operating method of a storage system according to some example embodiments.

Referring to FIG. 8, unlike FIG. 7, after providing a signature SIG to a storing device 30 (S712), a host 10' may provide a command CMD to the storage device 30 (S713). That is, the host 10' may include the signature SIG and the command CMD in different packets, and may provide the different packets to the storage device 30 discontinuously in time.

Figure 9:
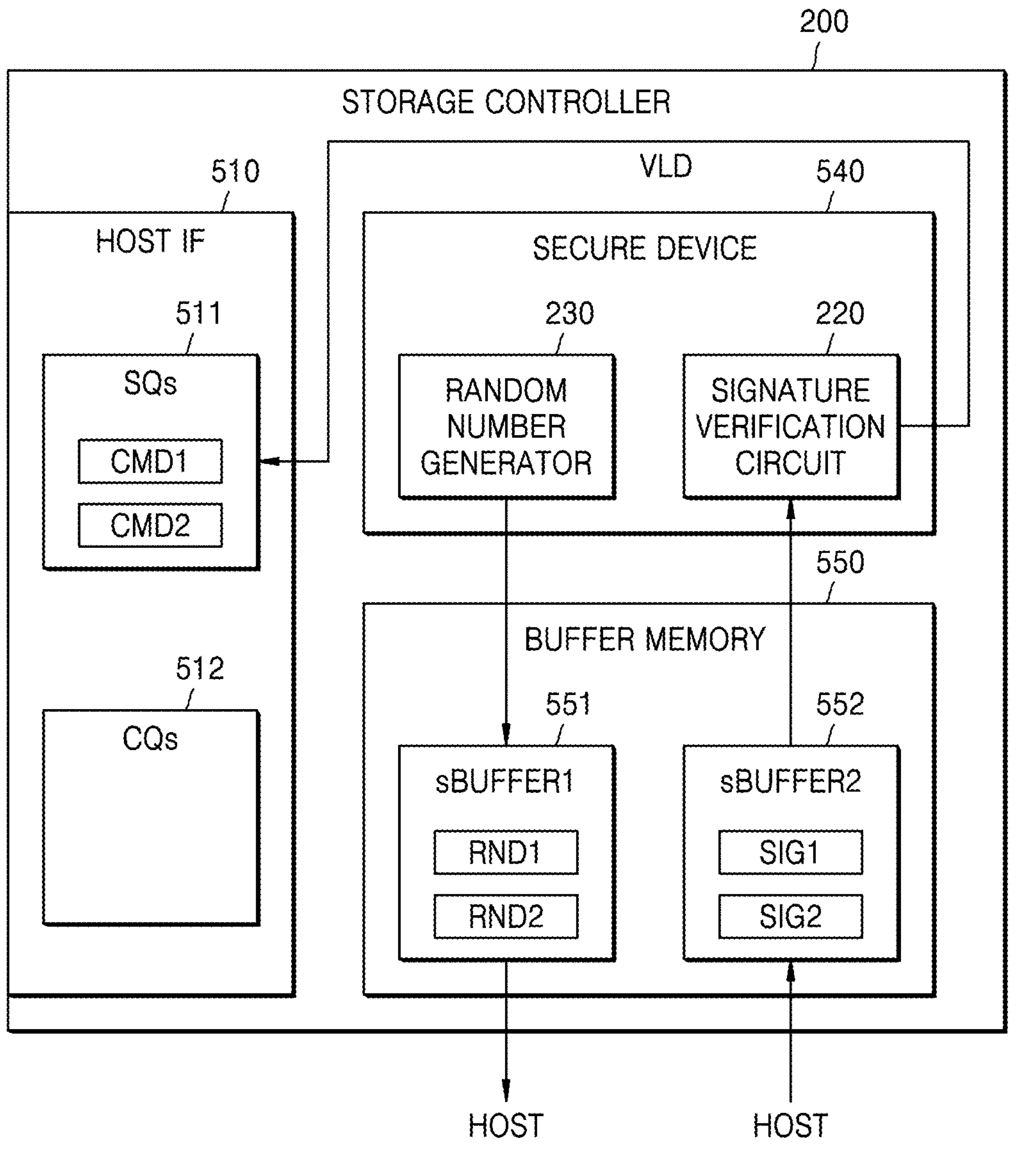
FIG. 9 is a diagram of a storage controller according to some example embodiments.

FIG. 9 is a diagram of a storage controller 200 according to some example embodiments.

Referring to FIG. 9, the storage controller 200 may include a host interface 510, a secure device 540, and a buffer memory 550.

The host interface 510 may include a storage submission queue 511 and a storage completion queue 512.

The storage submission queue 511 may store commands CMD1 and CMD2 received from the host 10. In some example embodiments, the storage submission queue 511 may store unprocessed commands. The storage submission queue 511 may have the form of a circular queue.

The storage completion queue 512 may store information on a processed command among the commands CMD1 and CMD2 received from the host 10. In some example embodiments, the storage controller 200 may provide a response informing the host 10 that the processing of the command has been completed based on the information stored in the storage completion queue 512.

The buffer memory 550 may include a first storage buffer 551 and a second storage buffer 552. The first storage buffer 551 may store random values RND1 and RND2 corresponding to the commands CMD1 and CMD2, and the second storage buffer 552 may store signatures SIG1 and SIG2 corresponding to the commands CMD1 and CMD2. Since the random value is a unique value for the command, the first and second random values RND1 and RND2 may be different from each other. Since signatures are generated based on different random values, the first and second signatures SIG1 and SIG2 may be different from each other. The first storage buffer 551 of FIG. 9 may correspond to the random value buffer 210 of FIG. 1.

The secure device 540 may include a signature verification circuit 220 and a random number generator 230. The random number generator 230 may generate random values RND1 and RND2 corresponding to the commands CMD1 and CMD2 stored in the storage submission queue 511, and may store the random values RND1 and RND2 in the first storage buffer 551. The random values RND1 and RND2 may be provided to the host 10, and the host 10 may generate the signatures SIG1 and SIG2 based on the random values RND1 and RND2. The signatures SIG1 and SIG2 received from the host 10 may be stored in the second storage buffer 552.

The signature verification circuit 220 may verify the signatures SIG1 and SIG2, and may delete the command stored in the storage submission queue 511 according to the verification result. For example, when the verification of the first signature SIG1 fails, the first command CMD1 is not reliable, and thus, the first commands CMD1 stored in the storage submission queue 511 may be deleted. Furthermore, the storage controller 200 may provide information indicating that the verification of the first command CMD1 has failed to the host 10.

In some example embodiments, at least some of the random values RND1 and RND2 and the signatures SIG1 and SIG2 stored in the first and second storage buffers 551 and 552 may be deleted depending on the verification result for the signatures SIG1 and SIG2. For example, when the verification of the first signature SIG1 is successful, the first random value RND1 may be deleted from the first storage buffer 551, or the first signature SIG1 may be deleted from the second storage buffer 552. Alternatively, when the verification of the signatures SIG1 and SIG2 is performed, regardless of the verification result, the signature for which verification has been performed and/or a random value corresponding to the signature may be deleted. For example, when the verification of the first signature SIG1 is performed, regardless of the verification result, the first sign SIG1 may be deleted from the second storage buffer 552, or the first random value RND1 may be deleted from the first storage buffer 551.

Figure 10:
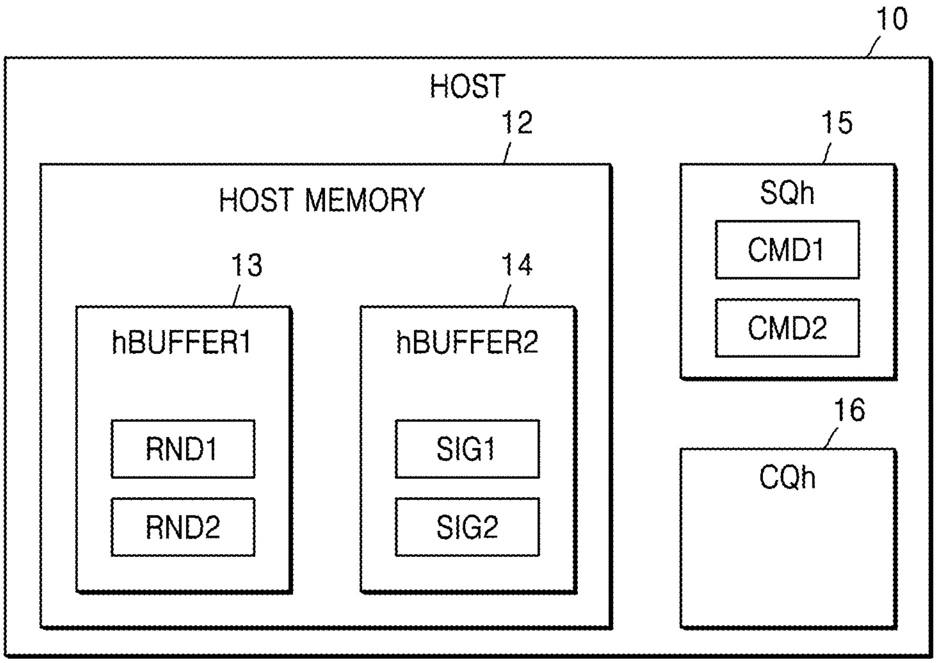
FIG. 10 is a diagram of a host according to some example embodiments.

FIG. 10 is a diagram of a host 10 according to some example embodiments.

Referring to FIG. 10, the host 10 may include a host memory 12, a host submission queue 15, and a host completion queue 16.

The host memory 12 may include a first host buffer 13 and a second host buffer 14.

The first host buffer 13 may store first and second random values RND1 and RND2 received from the storage device 20. The second host buffer 14 may store first and second signatures SIG1 and SIG2 generated by the command signature generator 300. Since the random value is a unique value for the command, the first and second random values RND1 and RND2 may be different from each other. Since signatures are generated based on different random values, the first and second signatures SIG1 and SIG2 may be different from each other.

The host submission queue 15 may store first and second commands CMD1 and CMD2 generated by the host 10. When a response to the command is received from the storage device 20, the command corresponding to the response may be deleted from the host submission queue 15.

The host completion queue 16 may store information about the processed command. When a response to the command is received from the storage device 20, information on the command corresponding to the response may be stored in the host completion queue 16.

According to some example embodiments, when verification of the command fails in the storage device 20, the command is not deleted from the host submission queue 15 and may be provided to the storage device 20 again. According to some example embodiments, when the command is not processed, but verification of the command fails, the command may be deleted from the host submission queue 15.

Figure 11:
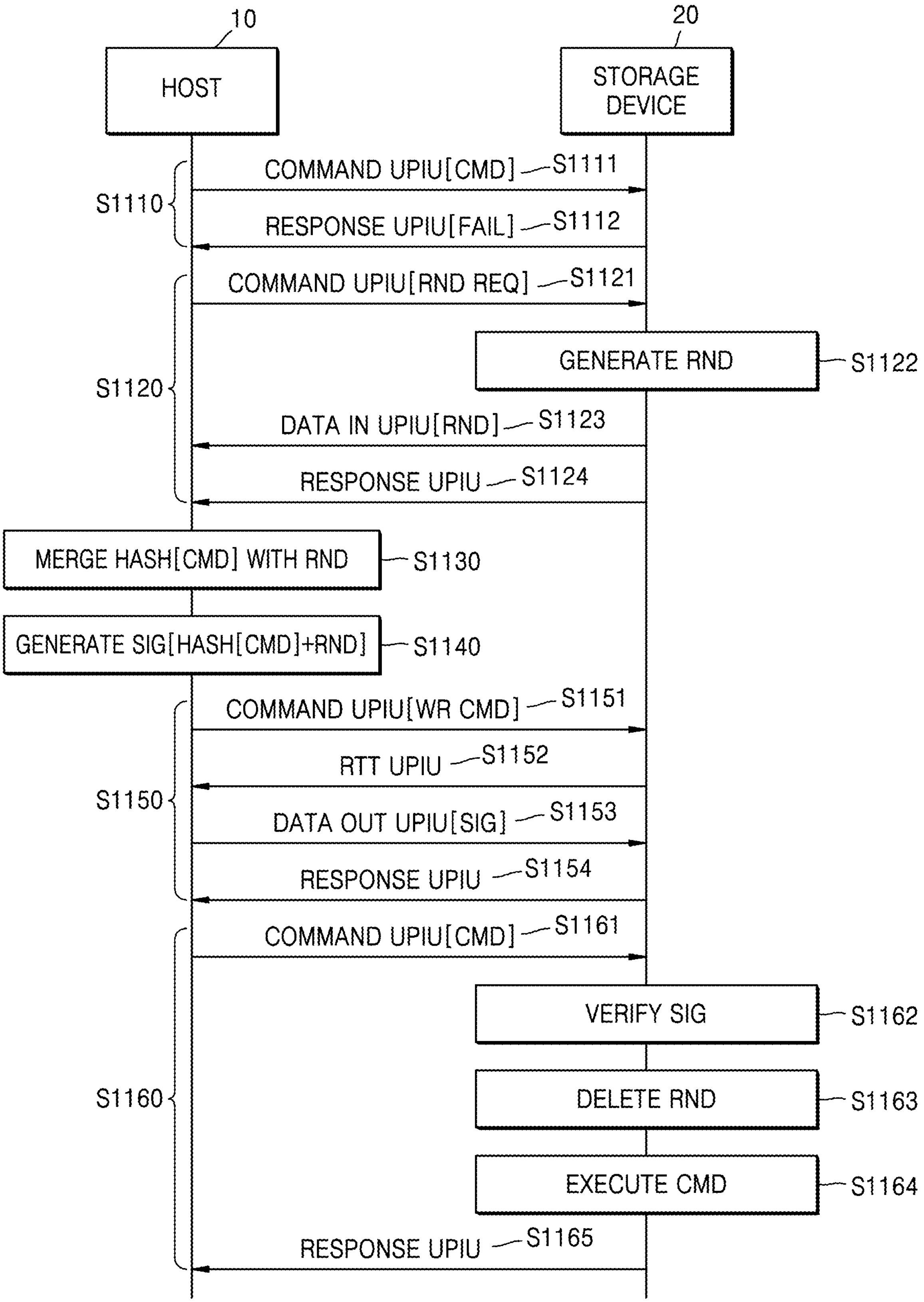
FIG. 11 is a diagram illustrating an operating method of a storage system according to some example embodiments.

FIG. 11 is a diagram illustrating an operating method of a storage system according to some example embodiments. In FIG. 11, a host 10 and a storage device 20 may be assumed to conform to a UFS standard.

Referring to FIG. 11, in a command execution failure process (S1110), authentication for the command may fail. Specifically, in the command execution failure process S1110, the host 10 may provide a command UFS protocol information unit (UPIU) including a vendor command CMD to the storage device 20 (S1111). The command UPIU may be described in detail with reference to FIG. 13. The storage device 20 may verify the vendor command CMD, and may provide a response UPIU including information FAIL indicating that verification of the command has failed to the host 10 based on the verification result (S1112). The response UPIU may be described in detail with reference to FIG. 14.

In a random value exchange process S1120, the host 10 may provide a command UPIU including a request for a random value RND REQ to the storage device 20 (S1121). The storage device 20 may generate a random value RND corresponding to the command CMD in response to the command UPIU (S1122). The storage device 20 may provide a data in UPIU including the random value RND to the host 10 (S1123). The data in UPIU may be described in detail with reference to FIG. 16. The storage device 20 may provide a response UPIU indicating the end of the random value exchange process S1120 to the host 10 (S1124).

The host 10 may generate a hash value HASH [CMD] for the command CMD, and may merge the hash value HASH [CMD] with the random value RND to generate a merged digest HASH [CMD]+RND (S1130). The host 10 may generate a signature SIG for the merged digest HASH [CMD]+RND based on at least one of a private key and a public key (S1140).

In a signature exchange process S1150, the host 10 may provide a command UPIU including a write command WR CMD to the storage device 20 (S1151). The storage device 20 may provide a ready-to-transfer (RTT) UPIU indicating that data is ready to be received to the host 10 (S1152). The RTT UPIU may be described in detail with reference to FIG. 17. The host 10 may provide a data out UPIU including the signature SIG to the storage device 20 (S1153). The data out UPIU may be described in detail with reference to FIG. 15. When reception of the signature SIG is completed, the storage device 20 may provide the response UPIU to the host 10 (S1154).

In a command execution process S1160, authentication of the command CMD may be successful. Specifically, in the command execution process S1160, the host 10 may provide a command UPIU including the command CMD to the storage device 20 (S1161). The command CMD may be the same as the command CMD provided to the storage device 20 in operation S1111. The storage device 20 may verify the signature SIG. Specifically, the storage device 20 may generate a merged digest by merging the hash value of the command CMD with the random value RND. The storage device 20 may generate a signature (e.g., SIG' of FIG. 3) for the merged digest based on at least one of the public key and the private key. The storage device 20 may generate the verification result for the signature SIG by comparing the generated signature SIG' with the signature SIG received from the host 10. The storage device 20 may delete the random value RND from the first storage buffer 551 of FIG. 9 after verification. Therefore, although the same command CMD is provided by the attacker later, the verification of the command CMD may fail and the command CMD may not be processed, thereby improving the security. The storage device 20 may execute the command CMD when the verification result is successful (S1164). When the execution of the command CMD is completed, the storage device 20 may delete the command CMD from the storage submission queue 511, and may store information about the command CMD in the storage completion queue 512. The storage device 20 may provide a response UPIU indicating that the execution of the command CMD has been completed to the host 10 (S1165). In response to the response UPIU, the host 10 may delete the command CMD stored in the host submission queue 15, and may store information about the command CMD in the host completion queue 16.

Figure 12:
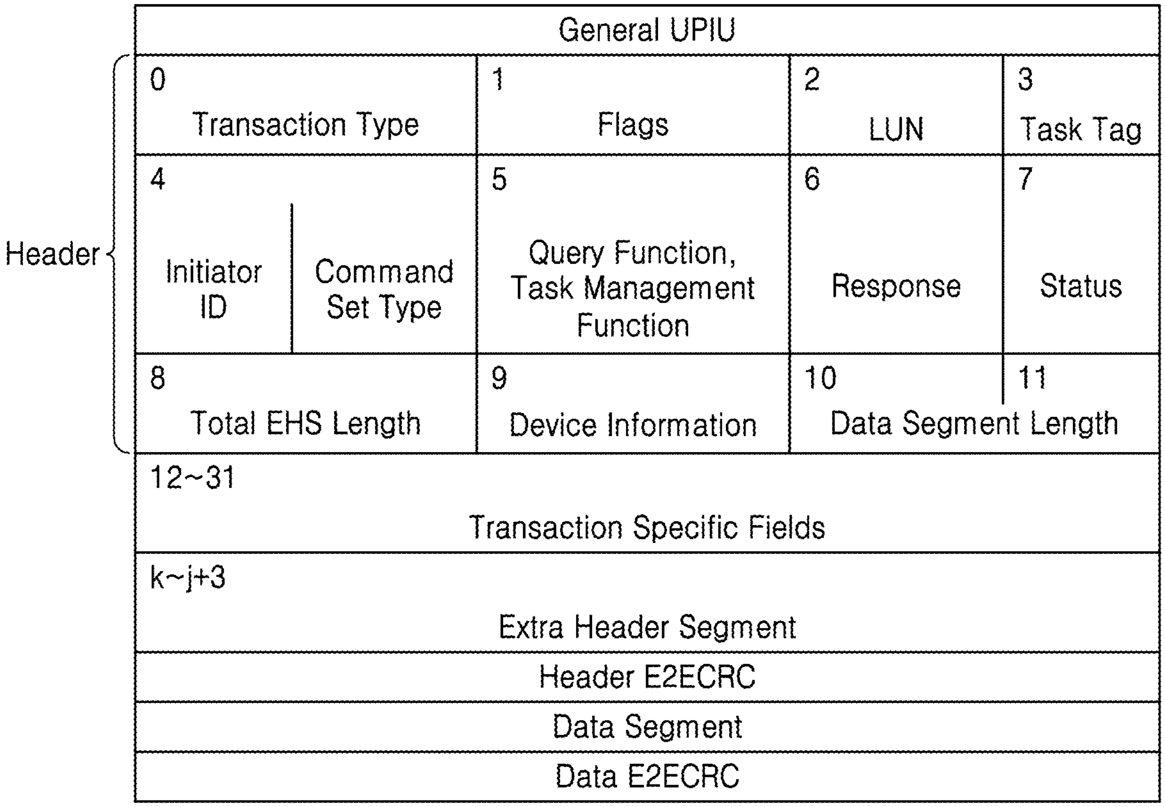
FIG. 12 is a diagram of a data structure of a general UPIU according to some example embodiments.

FIG. 12 is a diagram of a data structure of a general UPIU according to some example embodiments.

Specifically, referring to FIG. 12, the general UPIU may have a data structure including a transaction-type field, a flag field, a logical unit number (LUN) field, a task tag field, an initiator ID field, a command set-type field, a query function, task management function field, a response field, a status field, a total extra header segment (EHS) length field, a device information field, a data segment length field (herein referred to as a header), a transaction-specific field, an extra header segment field, a header end-to-end cyclic redundancy check (E2ECRC) field, a data segment field, and a data E2ECRC field. The length of the header may be, but is not limited to, 12 bytes. The UPIU may have a minimum length of 32 bytes and a maximum length of 65600 bytes, but is not limited thereto.

The transaction-type field may indicate a type of a request or a response included in the data structure. Specifically, the transaction type may include a transaction code, and the transaction code may define the content, function, or use of the UPIU. The flag field may have different values depending on the transaction type.

The LUN field may include a logical unit number in a target device where the request is provided. The target device may be, for example, the storage device 20 of FIG. 1, and a storage area of the storage device 20 may be matched to at least one logical unit number.

The task tag field may be a value corresponding to the task request, and may be an increasing value each time a new task request is generated. When a plurality of UPIUs are generated for one task request, all UPIUs may have the same task tag field value. For example, the task tag field may consist of 8 bits.

The command set-type field may indicate a command set type associated with the command UPIU and the response UPIU. The command UPIU may be a UPIU provided by the host 10 to the storage device 20, and the response UPIU may be a UPIU provided by the storage device 20 to the host 10.

The query function, task management function field may be a field used in a query request UPIU and a query response UPIU to define the query function, and may be a field used in a task management request UPIU to define a task management function.

The response field may indicate whether the requested function was successful when a response is required from the storage device 20.

The state field may include a small computer system interface (SCSI) state when the UPIU is a response UPIU.

The total EHS length field may indicate a length of an additional header segment in the UPIU. The length of the additional header segment may be a multiple of 4 bytes.

The device information field may provide information about the storage device 20, that is, information about the device level, within the response UPIU.

The data segment length field may indicate the number of valid bytes of the data segment in the UPIU.

The transaction-specific field may be an additional field required by a particular transaction code.

The additional header segment field may be present when the total EHS length field has a non-zero value, and may have a length corresponding to a multiple of 4 bytes.

The data segment field may have a length corresponding to a multiple of 4 bytes, and may include a data payload.

The header E2ECRC field may include CRC data for correcting an error in the header, and the data E2ECRC field may include CRC data for correcting an error in the data segment.

FIG. 13 is a diagram of a data structure of a command UPIU according to some example embodiments. FIG. 13 may be described with reference to FIGS. 1, 11, and 12.

The command UPIU may be a packet provided by the host 10 to the storage device 20. Referring to FIGS. 12 and 13, the transaction code of the command UPIU may be xx00 0001b, but is not limited thereto.

In FIG. 11, the host 10 may provide the command UPIU including the request REQ for the random value RND to the storage device 20 (S1121). The request REQ for the random value RND may be included in one of a flag field, a command set-type field, an auxiliary field, and a command descriptor block (CDB) field.

The command UPIU may include an expected data transfer length field. The expected data transfer length field may indicate a length of write data to be transmitted. For example, in operation S1151 of FIG. 11, the expected data transfer length field of a write command WR CMD may indicate a length of the signature SIG.

The command UPIU may include a CDB field. The CDB field may include an opcode of the command. The command UPIU may correspond to a write command UPIU or a read command UPIU according to the opcode. For example, the CDB field may include a write buffer command of FIG. 18 or the write command WR CMD of FIG. 11. The CDB field may include a logical address.

FIG. 14 is a diagram of a data structure of a response UPIU according to some example embodiments. FIG. 14 may be described with reference to FIGS. 1 and 12.

The response UPIU may be a packet provided by the storage device 20 to the host 10. Referring to FIGS. 12 and 14, the transaction code of the response UPIU may be xx 10 0001b, but is not limited thereto.

The response UPIU may include a remaining transfer count field. The remaining transfer count field may indicate the number of unit sizes not transmitted to the host 10.

The response UPIU may include a sense data field and a sense data length field. The sense data field may be a field that indicates whether an error of a previously executed command has occurred. When the previously executed command has been successfully executed, the sense data field may be 0. The sense data length field may be a field indicating a length of valid sense data.

In FIG. 11, the storage device 20 may provide the response UPIU including fail information FAIL indicating that verification of the command has failed to the host 10 (S1112). The fail information FAIL may be included in the flag field, the command set-type field, the auxiliary field, the response field, the state field, the sense data length field, or the sense data field.

FIG. 15 is a diagram of a data structure of a data out UPIU according to some example embodiments. FIG. 15 may be described with reference to FIGS. 1 and 12.

The data out UPIU may be a packet provided by the host 10 to the storage device 20. Referring to FIGS. 12 and 15, the transaction code of the data out UPIU may be xx00 0010b, but is not limited thereto.

The data out UPIU may include a data buffer offset field, a data transfer count field, and a data field.

The data buffer offset field may include an offset of an area where a data payload included in the current data out UPIU is stored among areas where the entire data is transmitted. Specifically, the host 10 may provide data to the storage device 20 by using a plurality of data out UPIUs, and the data buffer offset field may include an offset of an area where data included in the current data out UPIU is stored. For example, as described above in FIG. 11, when the signature SIG is included in the data out UPIU, the data buffer offset field may include an offset of an area where the signature SIG is stored in the second host buffer 14.

The data transfer count field may indicate the number of bytes transmitted from the current data out UPIU.

The data field may include a data payload. For example, as described above in FIG. 11, when the signature SIG is included in the data out UPIU, the signature SIG may be included in the data field.

FIG. 16 is a diagram of a data structure of a data in UPIU according to some example embodiments. FIG. 16 may be described with reference to FIGS. 1 and 12.

The data in UPIU may be a packet provided by the storage device 20 to the host 10. Referring to FIGS. 12 and 16, the transaction code of the data in UPIU may be xx 10 0010b, but is not limited thereto.

The data in UPIU may include a data buffer offset field, a data transfer count field, and a data field.

The data buffer offset field may include an offset of an area where a data payload included in the current data in UPIU is stored among areas where the entire data is transmitted. Specifically, the storage device 20 may provide data to the host 10 by using a plurality of data in UPIUs, and the data buffer offset field may include an offset of an area where data included in the current data in UPIU is stored. For example, as described above in FIG. 11, when the random value RND is included in the data in UPIU, the data buffer offset field may include an offset of an area where the random value RND is stored in the first storage buffer 551.

The data transfer count field may indicate the number of bytes transmitted from the current data in UPIU.

The data field may include a data payload. For example, as described above in FIG. 11, when the random value RND is included in the data in UPIU, the random value RND may be included in the data field.

Figure 17:
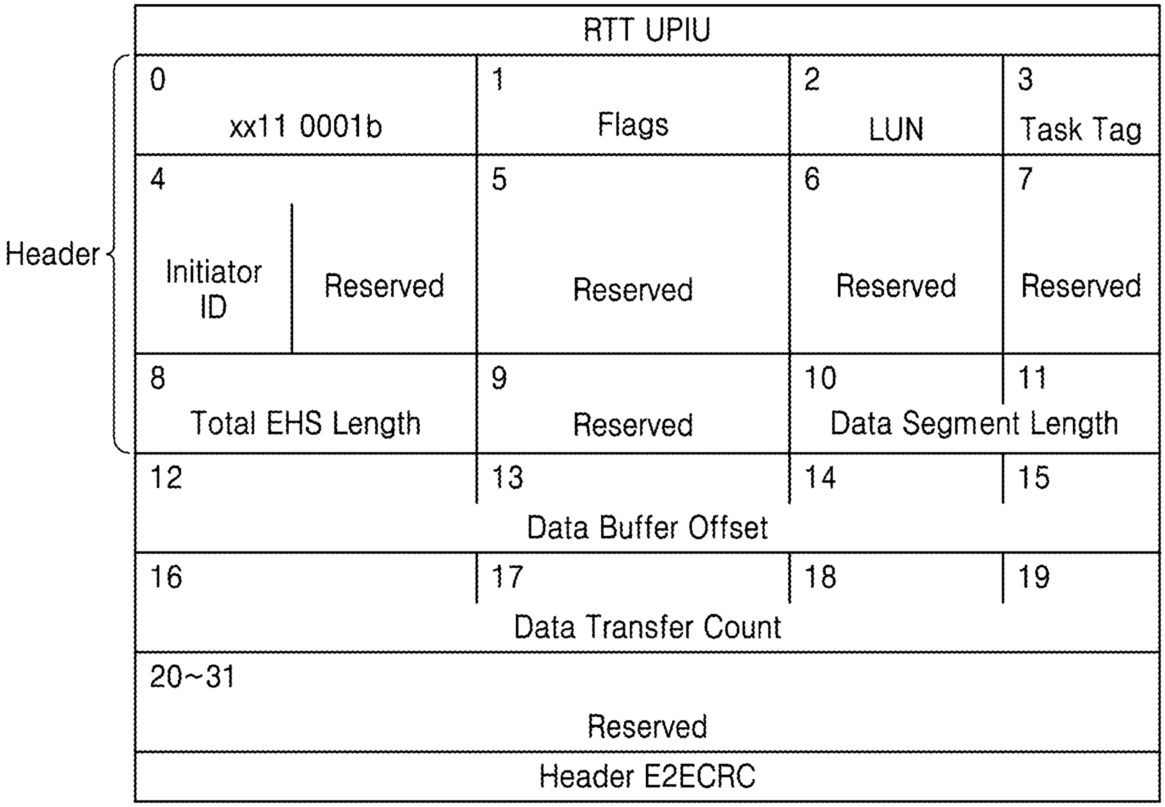
FIG. 17 is a diagram of a data structure of a ready-to-transfer (RTT) UPIU according to some example embodiments.

FIG. 17 is a diagram of a data structure of an RTT UPIU according to some example embodiments. FIG. 17 may be described with reference to FIGS. 1 and 12.

The RTT UPIU may be a packet provided by the storage device 20 to the host 10. Referring to FIGS. 12 and 17, the transaction code of the RTT UPIU may be xx00 0001b, but is not limited thereto.

The RTT UPIU may include a data buffer offset field and a data transfer count field.

The data buffer offset field may include an offset of an area where a data payload included in the data out UPIU corresponding to the RTT UPIU among areas where the entire data is transmitted is stored. Specifically, when the storage device 20 provides the RTT UPIU to the host 10, the host 10 may provide the data out UPIU to the storage device 20 in response to the RTT UPIU. Accordingly, the storage device 20 may determine a location of data to be provided through the RTT UPIU. For example, as described above in FIG. 11, when the signature SIG is included in the data out UPIU, the data buffer offset field of the RTT UPIU may include an offset of an area where the signature SIG is stored in the second host buffer 14.

The data transfer count field may indicate the number of bytes transmitted from the data buffer offset.

FIG. 18 is a diagram of a structure of a write buffer command according to some example embodiments.

The write buffer command may be included in the CDB field of FIG. 13. The write buffer command may include an opcode field, a mode field, a buffer ID field, a buffer offset field, and a parameter list length field.

The opcode field of the write buffer command may be 3 Bh, but is not limited thereto.

The mode field may include values that specify a function of the command. For example, a value corresponding to a function specified by a vendor may be included.

The buffer ID field may include a value specifying a buffer corresponding to a logical unit (LU). For example, the buffer ID field may have a value designating a LU 2211 of FIG. 19.

The buffer offset field may include a value specifying an offset byte of the buffer from which data is to be transmitted.

The parameter list length field may include a value specifying the maximum number of bytes of transmitted data.

Figure 19:
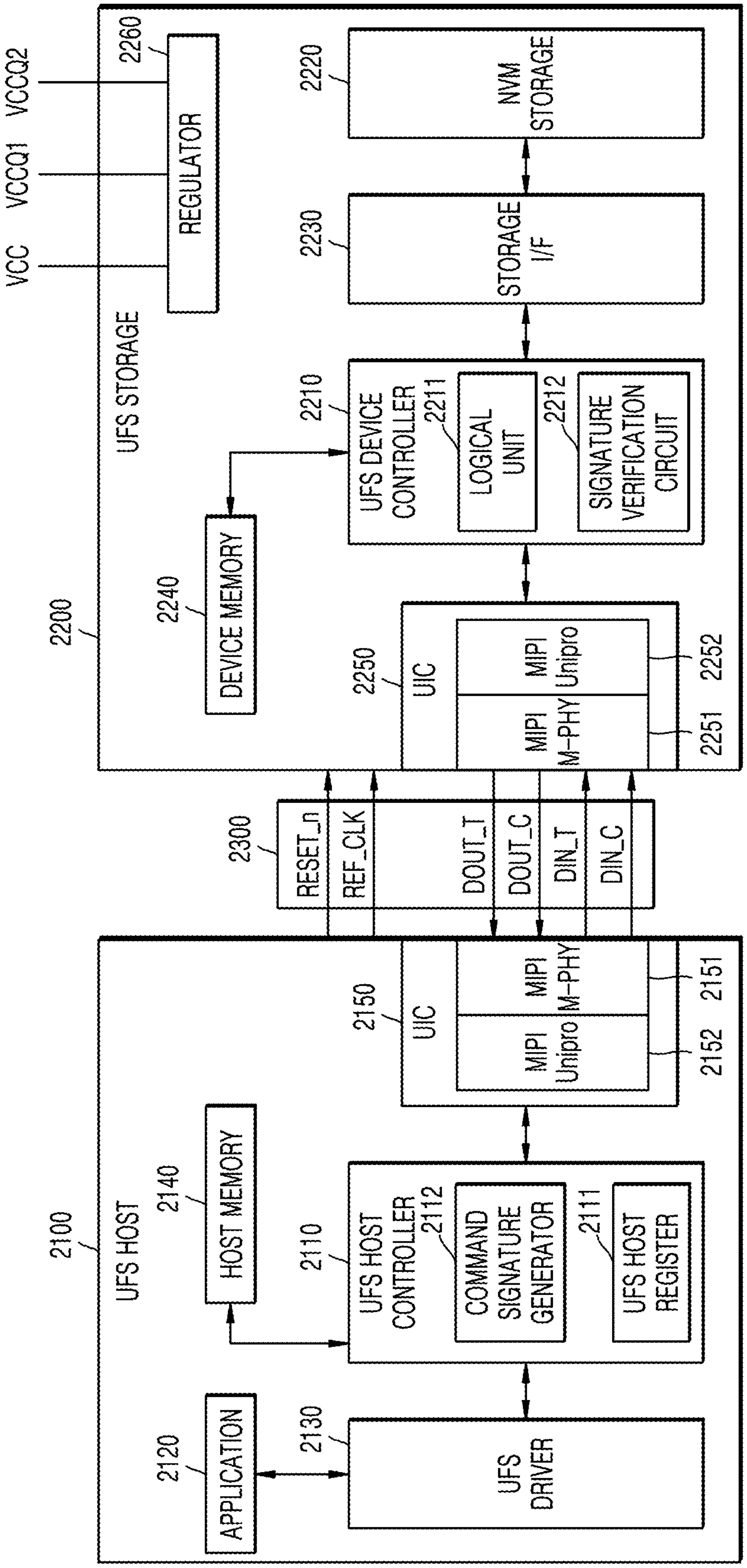
FIG. 19 is a diagram of a UFS system according to some example embodiments.

FIG. 19 is a diagram of a UFS system 2000 according to some example embodiments. The UFS system 2000 may be a system conforming to a UFS standard announced by Joint Electron Device Engineering Council (JEDEC) and include a UFS host 2100, a UFS device 2200, and a UFS interface 2300. The above description of the storage system 1 of FIGS. 1 to 18 may also be applied to the UFS system 2000 of FIG. 19 within a range that does not conflict with the following description of FIG. 19.

Referring to FIG. 19, the UFS host 2100 may be connected to the UFS device 2200 through the UFS interface 2300. The UFS host 2100 may be implemented as a portion of the AP.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. The UFS controller 2110 may include a command signature generator 2112 and a UFS host register 2111. During the transmission of the UFS command, the UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHZ, 26 MHZ, 38.4 MHZ, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 19, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 19, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined or alternatively desirable range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. In addition, the UFS device controller 2210 may transmit user data, which is temporarily stored in the device memory 2240, to the UFS host 2100. In addition, the UFS device controller 2210 may further include an AES engine (not shown). The AES engine may perform at least one of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

The UFS host controller 2110 may include a command signature generator 2112. The command signature generator 2212 may correspond to the command signature generator 300 described based on FIGS. 1 to 18.

The UFS host controller 2210 may include a command verification circuit 2212. The command verification circuit 2212 may correspond to the command verification circuit 220 described based on FIGS. 1 to 18.

Figure 20:
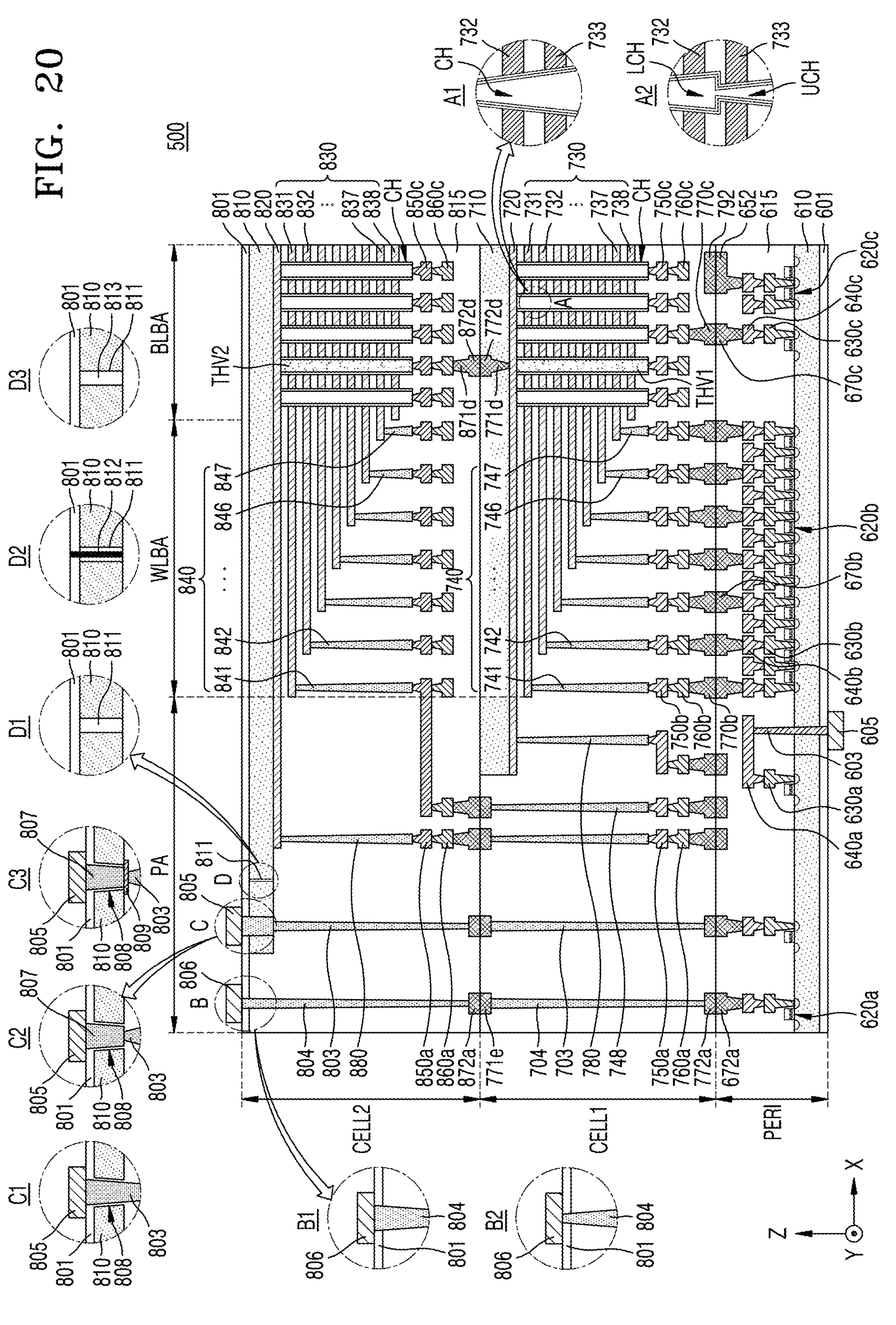
FIG. 20 is a diagram of a memory device according to some example embodiments.

FIG. 20 is a view illustrating a memory device 500 according to some example embodiments.

Referring to FIG. 20, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 500 may include the at least one upper chip including the cell region. For example, as illustrated in FIG. 20, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 20. However, example embodiments of the inventive concepts are not limited thereto. In some example embodiments, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 610 and a plurality of circuit elements 620*a*, 620*b* and 620*c* formed on the first substrate 610. An interlayer insulating layer 615 including one or more insulating layers may be provided on the plurality of circuit elements 620*a*, 620*b* and 620*c*, and a plurality of metal lines electrically connected to the plurality of circuit elements 620*a*, 620*b* and 620*c* may be provided in the interlayer insulating layer 615. For example, the plurality of metal lines may include first metal lines 630*a*, 630*b* and 630*c* connected to the plurality of circuit elements 620*a*, 620*b* and 620*c*, and second metal lines 640*a*, 640*b* and 640*c* formed on the first metal lines 630*a*, 630*b* and 630*c*. The plurality of metal lines may be formed of at least one of various conductive materials. For example, the first metal lines 630*a*, 630*b* and 630*c* may be formed of tungsten having a relatively high electrical resistivity, and the second metal lines 640*a*, 640*b* and 640*c* may be formed of copper having a relatively low electrical resistivity.

The first metal lines 630*a*, 630*b* and 630*c* and the second metal lines 640*a*, 640*b* and 640*c* are illustrated and described in the present example embodiments. However, example embodiments of the inventive concepts are not limited thereto. In certain example embodiments, at least one or more additional metal lines may further be formed on the second metal lines 640*a*, 640*b* and 640*c*. In this case, the second metal lines 640*a*, 640*b* and 640*c* may be formed of aluminum, and at least some of the additional metal lines formed on the second metal lines 640*a*, 640*b* and 640*c* may be formed of copper having an electrical resistivity lower than that of aluminum of the second metal lines 640*a*, 640*b* and 640*c*.

The interlayer insulating layer 615 may be disposed on the first substrate 610 and may include an insulating material such as silicon oxide and/or silicon nitride.

Each of the first and second cell regions CELL1 and CELL2 may include at least one memory block. The first cell region CELL1 may include a second substrate 710 and a common source line 720. A plurality of word lines 730 (731 to 738) may be stacked on the second substrate 710 in a direction (e.g., the Z-axis direction) perpendicular to a top surface of the second substrate 710. String selection lines and a ground selection line may be disposed on and under the word lines 730, and the plurality of word lines 730 may be disposed between the string selection lines and the ground selection line. Likewise, the second cell region CELL2 may include a third substrate 810 and a common source line 820, and a plurality of word lines 830 (831 to 838) may be stacked on the third substrate 810 in a direction (e.g., the Z-axis direction) perpendicular to a top surface of the third substrate 810. Each of the second substrate 710 and the third substrate 810 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some example embodiments, as illustrated in a region 'A1', the channel structure CH may be provided in the bit line bonding region BLBA and may extend in the direction perpendicular to the top surface of the second substrate 710 to penetrate the word lines 730, the string selection lines, and the ground selection line. The channel structure CH may include a data storage layer, a channel layer, and a filling insulation layer. The channel layer may be electrically connected to a first metal line 750*c* and a second metal line 760*c* in the bit line bonding region BLBA. For example, the second metal line 760*c* may be a bit line and may be connected to the channel structure CH through the first metal line 750*c*. The bit line 760*c* may extend in a first direction (e.g., a Y-axis direction) parallel to the top surface of the second substrate 710.

In some example embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 710 to penetrate the common source line 720 and lower word lines 731 and 732. The lower channel LCH may include a data storage layer, a channel layer, and a filling insulation layer and may be connected to the upper channel UCH. The upper channel UCH may penetrate upper word lines 733 to 738. The upper channel UCH may include a data storage layer, a channel layer, and a filling insulation layer, and the channel layer of the upper channel UCH may be electrically connected to the first metal line 750*c* and the second metal line 760*c*. As a length of a channel increases, due to characteristics of manufacturing processes, it may be difficult to form a channel having a substantially uniform width. The memory device 500 according to the present example embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word line located near to a boundary between the lower channel LCH and the upper channel UCH may be a dummy word line. For example, the word lines 732 and 733 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 731 and 732 penetrated by the lower channel LCH is less than the number of the upper word lines 733 to 738 penetrated by the upper channel UCH in the region 'A2'. However, example embodiments of the inventive concepts are not limited thereto. In certain example embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 20, the first through-electrode THV1 may penetrate the common source line 720 and the plurality of word lines 730. In certain example embodiments, the first through-electrode THV1 may further penetrate the second substrate 710. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some example embodiments, the first through-electrode THV1 and the second through-electrode THV2 may be electrically connected to each other through a first through-metal pattern 772*d* and a second through-metal pattern 872*d*. The first through-metal pattern 772*d* may be formed at a bottom end of the first upper chip including the first cell region CELL1, and the second through-metal pattern 872*d* may be formed at a top end of the second upper chip including the second cell region CELL2. The first through-electrode THV1 may be electrically connected to the first metal line 750*c* and the second metal line 760*c*. A lower via 771*d* may be formed between the first through-electrode THV1 and the first through-metal pattern 772*d*, and an upper via 871*d* may be formed between the second through-electrode THV2 and the second through-metal pattern 872*d*. The first through-metal pattern 772*d* and the second through-metal pattern 872*d* may be connected to each other by the bonding method.

In addition, in the bit line bonding region BLBA, an upper metal pattern 652 may be formed in an uppermost metal layer of the peripheral circuit region PERI, and an upper metal pattern 792 having the same shape as the upper metal pattern 652 may be formed in an uppermost metal layer of the first cell region CELL1. The upper metal pattern 792 of the first cell region CELL1 and the upper metal pattern 652 of the peripheral circuit region PERI may be electrically connected to each other by the bonding method. In the bit line bonding region BLBA, the bit line 760*c* may be electrically connected to a page buffer included in the peripheral circuit region PERI. For example, some of the circuit elements 620*c* of the peripheral circuit region PERI may constitute the page buffer, and the bit line 760*c* may be electrically connected to the circuit elements 620*c* constituting the page buffer through an upper bonding metal pattern 770*c* of the first cell region CELL1 and an upper bonding metal pattern 670*c* of the peripheral circuit region PERI.

Referring continuously to FIG. 20, in the word line bonding region WLBA, the word lines 730 of the first cell region CELL1 may extend in a second direction (e.g., an X-axis direction) parallel to the top surface of the second substrate 710 and may be connected to a plurality of cell contact plugs 740 (741 to 747). First metal lines 750*b* and second metal lines 760*b* may be sequentially connected onto the cell contact plugs 740 connected to the word lines 730. In the word line bonding region WLBA, the cell contact plugs 740 may be connected to the peripheral circuit region PERI through upper bonding metal patterns 770*b* of the first cell region CELL1 and upper bonding metal patterns 670*b* of the peripheral circuit region PERI.

The cell contact plugs 740 may be electrically connected to a row decoder included in the peripheral circuit region PERI. For example, some of the circuit elements 620*b* of the peripheral circuit region PERI may constitute the row decoder, and the cell contact plugs 740 may be electrically connected to the circuit elements 620*b* constituting the row decoder through the upper bonding metal patterns 770*b* of the first cell region CELL1 and the upper bonding metal patterns 670*b* of the peripheral circuit region PERI. In some example embodiments, an operating voltage of the circuit elements 620*b* constituting the row decoder may be different from an operating voltage of the circuit elements 620*c* constituting the page buffer. For example, the operating voltage of the circuit elements 620*c* constituting the page buffer may be greater than the operating voltage of the circuit elements 620*b* constituting the row decoder.

Likewise, in the word line bonding region WLBA, the word lines 830 of the second cell region CELL2 may extend in the second direction (e.g., the X-axis direction) parallel to the top surface of the third substrate 810 and may be connected to a plurality of cell contact plugs 840 (841 to 847). The cell contact plugs 840 may be connected to the peripheral circuit region PERI through an upper metal pattern of the second cell region CELL2 and lower and upper metal patterns and a cell contact plug 748 of the first cell region CELL1.

In the word line bonding region WLBA, the upper bonding metal patterns 770*b* may be formed in the first cell region CELL1, and the upper bonding metal patterns 670*b* may be formed in the peripheral circuit region PERI. The upper bonding metal patterns 770*b* of the first cell region CELL1 and the upper bonding metal patterns 670*b* of the peripheral circuit region PERI may be electrically connected to each other by the bonding method. The upper bonding metal patterns 770*b* and the upper bonding metal patterns 670*b* may be formed of aluminum, copper, or tungsten.

In the external pad bonding region PA, a lower metal pattern 771*e* may be formed in a lower portion of the first cell region CELL1, and an upper metal pattern 872*a* may be formed in an upper portion of the second cell region CELL2. The lower metal pattern 771*e* of the first cell region CELL1 and the upper metal pattern 872*a* of the second cell region CELL2 may be connected to each other by the bonding method in the external pad bonding region PA. Likewise, an upper metal pattern 772*a* may be formed in an upper portion of the first cell region CELL1, and an upper metal pattern 672*a* may be formed in an upper portion of the peripheral circuit region PERI. The upper metal pattern 772*a* of the first cell region CELL1 and the upper metal pattern 672*a* of the peripheral circuit region PERI may be connected to each other by the bonding method.

Common source line contact plugs 780 and 880 may be disposed in the external pad bonding region PA. The common source line contact plugs 780 and 880 may be formed of a conductive material such as a metal, a metal compound, and/or doped polysilicon. The common source line contact plug 780 of the first cell region CELL1 may be electrically connected to the common source line 720, and the common source line contact plug 880 of the second cell region CELL2 may be electrically connected to the common source line 820. A first metal line 750*a* and a second metal line 760*a* may be sequentially stacked on the common source line contact plug 780 of the first cell region CELL1, and a first metal line 850*a* and a second metal line 860*a* may be sequentially stacked on the common source line contact plug 880 of the second cell region CELL2.

Input/output pads 605, 805 and 806 may be disposed in the external pad bonding region PA. Referring to FIG. 20, a lower insulating layer 601 may cover a bottom surface of the first substrate 610, and a first input/output pad 605 may be formed on the lower insulating layer 601. The first input/output pad 605 may be connected to at least one of a plurality of the circuit elements 620*a* disposed in the peripheral circuit region PERI through a first input/output contact plug 603 and may be separated from the first substrate 610 by the lower insulating layer 601. In addition, a side insulating layer may be disposed between the first input/output contact plug 603 and the first substrate 610 to electrically isolate the first input/output contact plug 603 from the first substrate 610.

An upper insulating layer 801 covering a top surface of the third substrate 810 may be formed on the third substrate 810. A second input/output pad 805 and/or a third input/output pad 806 may be disposed on the upper insulating layer 801. The second input/output pad 805 may be connected to at least one of the plurality of circuit elements 620*a* disposed in the peripheral circuit region PERI through second input/output contact plugs 803 and 703, and the third input/output pad 806 may be connected to at least one of the plurality of circuit elements 620*a* disposed in the peripheral circuit region PERI through third input/output contact plugs 804 and 704.

In some example embodiments, the third substrate 810 may not be disposed in a region in which the input/output contact plug is disposed. For example, as illustrated in a region 'B', the third input/output contact plug 804 may be separated from the third substrate 810 in a direction parallel to the top surface of the third substrate 810 and may penetrate an interlayer insulating layer 815 of the second cell region CELL2 so as to be connected to the third input/output pad 806. In this case, the third input/output contact plug 804 may be formed by at least one of various processes.

In some example embodiments, as illustrated in a region 'B1', the third input/output contact plug 804 may extend in a third direction (e.g., the Z-axis direction), and a diameter of the third input/output contact plug 804 may become progressively greater toward the upper insulating layer 801. In other words, a diameter of the channel structure CH described in the region 'A1' may become progressively less toward the upper insulating layer 801, but the diameter of the third input/output contact plug 804 may become progressively greater toward the upper insulating layer 801. For example, the third input/output contact plug 804 may be formed after the second cell region CELL2 and the first cell region CELL1 are bonded to each other by the bonding method.

In certain example embodiments, as illustrated in a region 'B2', the third input/output contact plug 804 may extend in the third direction (e.g., the Z-axis direction), and a diameter of the third input/output contact plug 804 may become progressively less toward the upper insulating layer 801. In other words, like the channel structure CH, the diameter of the third input/output contact plug 804 may become progressively less toward the upper insulating layer 801. For example, the third input/output contact plug 804 may be formed together with the cell contact plugs 840 before the second cell region CELL2 and the first cell region CELL1 are bonded to each other.

In certain example embodiments, the input/output contact plug may overlap with the third substrate 810. For example, as illustrated in a region 'C', the second input/output contact plug 803 may penetrate the interlayer insulating layer 815 of the second cell region CELL2 in the third direction (e.g., the Z-axis direction) and may be electrically connected to the second input/output pad 805 through the third substrate 810. In this case, a connection structure of the second input/output contact plug 803 and the second input/output pad 805 may be realized by various methods.

In some example embodiments, as illustrated in a region 'C1', an opening 808 may be formed to penetrate the third substrate 810, and the second input/output contact plug 803 may be connected directly to the second input/output pad 805 through the opening 808 formed in the third substrate 810. In this case, as illustrated in the region 'C1', a diameter of the second input/output contact plug 803 may become progressively greater toward the second input/output pad 805. However, example embodiments of the inventive concepts are not limited thereto, and in certain example embodiments, the diameter of the second input/output contact plug 803 may become progressively less toward the second input/output pad 805.

In certain example embodiments, as illustrated in a region 'C2', the opening 808 penetrating the third substrate 810 may be formed, and a contact 807 may be formed in the opening 808. An end of the contact 807 may be connected to the second input/output pad 805, and another end of the contact 807 may be connected to the second input/output contact plug 803. Thus, the second input/output contact plug 803 may be electrically connected to the second input/output pad 805 through the contact 807 in the opening 808. In this case, as illustrated in the region 'C2', a diameter of the contact 807 may become progressively greater toward the second input/output pad 805, and a diameter of the second input/output contact plug 803 may become progressively less toward the second input/output pad 805. For example, the second input/output contact plug 803 may be formed together with the cell contact plugs 840 before the second cell region CELL2 and the first cell region CELL1 are bonded to each other, and the contact 807 may be formed after the second cell region CELL2 and the first cell region CELL1 are bonded to each other.

In certain example embodiments illustrated in a region 'C3', a stopper 809 may further be formed on a bottom end of the opening 808 of the third substrate 810, as compared with the example embodiments of the region 'C2'. The stopper 809 may be a metal line formed in the same layer as the common source line 820. Alternatively, the stopper 809 may be a metal line formed in the same layer as at least one of the word lines 830. The second input/output contact plug 803 may be electrically connected to the second input/output pad 805 through the contact 807 and the stopper 809.

Like the second and third input/output contact plugs 803 and 804 of the second cell region CELL2, a diameter of each of the second and third input/output contact plugs 703 and 704 of the first cell region CELL1 may become progressively less toward the lower metal pattern 771*e* or may become progressively greater toward the lower metal pattern 771*c*.

Meanwhile, in some example embodiments, a slit 811 may be formed in the third substrate 810. For example, the slit 811 may be formed at a certain position of the external pad bonding region PA. For example, as illustrated in a region 'D', the slit 811 may be located between the second input/output pad 805 and the cell contact plugs 840 when viewed in a plan view. Alternatively, the second input/output pad 805 may be located between the slit 811 and the cell contact plugs 840 when viewed in a plan view.

In some example embodiments, as illustrated in a region 'D1', the slit 811 may be formed to penetrate the third substrate 810. For example, the slit 811 may be used to prevent or reduce in likelihood the third substrate 810 from being finely cracked when the opening 808 is formed. However, example embodiments of the inventive concepts are not limited thereto, and in certain example embodiments, the slit 811 may be formed to have a depth ranging from about 60% to about 70% of a thickness of the third substrate 810.

In certain example embodiments, as illustrated in a region 'D2', a conductive material 812 may be formed in the slit 811. For example, the conductive material 812 may be used to discharge a leakage current occurring in driving of the circuit elements in the external pad bonding region PA to the outside. In this case, the conductive material 812 may be connected to an external ground line.

In certain example embodiments, as illustrated in a region 'D3', an insulating material 813 may be formed in the slit 811. For example, the insulating material 813 may be used to electrically isolate the second input/output pad 805 and the second input/output contact plug 803 disposed in the external pad bonding region PA from the word line bonding region WLBA. Since the insulating material 813 is formed in the slit 811, it is possible to prevent or reduce in likelihood a voltage provided through the second input/output pad 805 from affecting a metal layer disposed on the third substrate 810 in the word line bonding region WLBA.

Meanwhile, in certain example embodiments, the first to third input/output pads 605, 805 and 806 may be selectively formed. For example, the memory device 500 may be realized to include only the first input/output pad 605 disposed on the first substrate 610, to include only the second input/output pad 805 disposed on the third substrate 810, or to include only the third input/output pad 806 disposed on the upper insulating layer 801.

In some example embodiments, at least one of the second substrate 710 of the first cell region CELL1 or the third substrate 810 of the second cell region CELL2 may be used as a sacrificial substrate and may be completely or partially removed before or after a bonding process. An additional layer may be stacked after the removal of the substrate. For example, the second substrate 710 of the first cell region CELL1 may be removed before or after the bonding process of the peripheral circuit region PERI and the first cell region CELL1, and then, an insulating layer covering a top surface of the common source line 720 or a conductive layer for connection may be formed. Likewise, the third substrate 810 of the second cell region CELL2 may be removed before or after the bonding process of the first cell region CELL1 and the second cell region CELL2, and then, the upper insulating layer 801 covering a top surface of the common source line 820 or a conductive layer for connection may be formed.

The memory cell array 110 of FIG. 4 may be included in the first cell region CELL1 or the second cell region CELL2, and the peripheral circuit 120 of FIG. 4 may be included in the peripheral circuit region PERI.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the inventive concepts have been particularly shown and described with reference to example embodiments thereof, it will be understood that various changes in form and details may be made therein without departing from the spirit and scope of the following claims.

What is claimed is:

1. A storage system comprising:

a host configured to generate a hash value for a first command, merge the hash value with a random value, and provide a signature for the merged data and the first command; and a storage device configured to store the random value corresponding to the first command in a first buffer, provide the random value to the host, receive the first command and the signature from the host, store the signature in a second buffer, verify the signature, and in response to the verification being completed, delete the random value from the first buffer and execute the first command.

2. The storage system of claim 1, wherein the storage device is further configured to delete the signature from the second buffer in response to receiving the first command more than a reference number of times.

3. The storage system of claim 1, wherein the storage device is further configured to provide the random value to the host and request the signature when the signature corresponding to the first command does not exist in the second buffer.

4. The storage system of claim 1, wherein the storage device is further configured to provide the random value to the host and request a new signature for the first command when verification of the signature corresponding to the first command stored in the second buffer fails.

5. The storage system of claim 1, wherein the storage device comprises:

a storage submission queue configured to store a plurality of commands received from the host; and a storage completion queue configured to store information about a processed command among the plurality of commands, wherein the storage device is further configured to delete the first command from the storage submission queue when verification of the signature fails, and execute the first command and then store information about the first command in the storage completion queue in response to the verification of the signature being successful.

6. The storage system of claim 5, wherein the host comprises a host buffer storing random values corresponding to the plurality of commands, and wherein the random values are different from each other.

7. The storage system of claim 6, wherein the host buffer is further configured to store signatures corresponding to the plurality of commands, and wherein the signatures are different from each other.

8. The storage system of claim 7, wherein the storage device is further configured to provide a response to the host in response to execution of the first command being completed, wherein the host is configured to delete at least one of the signature and the random value for the first command from the host buffer in response to receiving the response.

9. An operating method of a storage system, the operating method comprising:

providing, from a storage device, a random value stored in a first buffer to a host;

generating, in the host, a signature for data generated by merging a hash value for a first command with the random value;

providing, from the host, the first command and the signature to the storage device;

storing, in the storage device, the signature in a second buffer;

verifying, in the storage device, the signature based on the random value; and executing, in the storage device, the first command based on a result of the verifying.

10. The operating method of claim 9, further comprising:

deleting, in the storage device, the random value from the first buffer based on the result of the verifying.

11. The operating method of claim 9, further comprising:

deleting, in the storage device, the signature from the second buffer in response to receiving the first command more than a reference number of times.

12. The operating method of claim 9, further comprising:

providing, in the storage device, the host with a request for the random value and the signature based on whether the signature corresponding to the first command exists in the second buffer.

13. The operating method of claim 9, further comprising:

deleting, in the storage device, the first command from a storage submission queue storing a plurality of commands received from the host based on failure of verification of the signature.

14. The operating method of claim 13, wherein the executing of the first command comprises:

executing, in the storage device, the first command based on successful verification of the signature; and after the executing of the first command, storing information about the first command in a storage completion queue wherein information about a processed command among the plurality of commands is stored.

15. The operating method of claim 9, further comprising:

providing, in the storage device, a response to the host based on completion of the executing of the first command; and deleting, in the host, at least one of the signature and the random value for the first command based on the response.

16. A storage system comprising:

a storage device configured to provide a random value, and, based on a received command and a signature, verify the signature, and execute the command when verification is completed; and a host configured to receive the random value, generate a hash value for the command, generate the signature for data generated by merging the hash value with the random value, and provide the command and the signature to the storage device.

17. The storage system of claim 16, wherein the storage device comprises:

a storage queue configured to store commands received from the host;

a first buffer configured to store random values corresponding to the commands; and a second buffer configured to store signatures corresponding to the commands, wherein the storage device is further configured to delete the random value corresponding to a first command from the first buffer when verification of the signature is successful.

18. The storage system of claim 17, wherein the storage device is configured to provide a new random value to the host and request a new signature for the first command in response to verification of the signature failing.

19. The storage system of claim 17, wherein the storage device is further configured to delete the first command from the storage queue in response to verification of the signature fails.

20. The storage system of claim 17, wherein the storage device is further configured to provide the random value to the host and request the signature in response to the signature corresponding to the first command not existing in the second buffer.

* * * * *